United States Patent
Visa et al.

(10) Patent No.: US 8,243,751 B2
(45) Date of Patent: Aug. 14, 2012

(54) METHODS OF TRANSMITTING AND RECEIVING DATA CONTENT IN A COMMUNICATIONS NETWORK, AND CORRESPONDING COMPUTER-READABLE STORAGE MEDIA AND DEVICES

(75) Inventors: Pierre Visa, Rennes (FR); Laurent Frouin, Rennes (FR); Arnaud Closset, Cesson-Sévigné (FR); Yacine El Kolli, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 228 days.

(21) Appl. No.: 12/054,911

(22) Filed: Mar. 25, 2008

(65) Prior Publication Data
US 2008/0259950 A1    Oct. 23, 2008

(30) Foreign Application Priority Data
Apr. 17, 2007 (FR) ...................... 07 02790

(51) Int. Cl.
  *H04L 12/43* (2006.01)
(52) U.S. Cl. .................. 370/458; 370/442; 455/450
(58) Field of Classification Search .............. 370/436, 370/442, 458, 329, 498, 503, 341, 443, 321, 370/322, 324, 326; 455/450, 452.1, 452.2
See application file for complete search history.

(56) References Cited

U.S. PATENT DOCUMENTS

| | | | | |
|---|---|---|---|---|
| 4,445,213 A * | 4/1984 | Baugh et al. | .................. | 370/405 |
| 5,361,261 A * | 11/1994 | Edem et al. | .................. | 370/445 |
| 6,084,863 A * | 7/2000 | Hori | .............................. | 370/315 |
| 6,128,318 A * | 10/2000 | Sato | ............................... | 370/503 |
| 6,188,699 B1 * | 2/2001 | Lang et al. | ..................... | 370/463 |
| 6,577,610 B1 * | 6/2003 | Kronz | ........................... | 370/322 |
| 6,891,797 B1 | 5/2005 | Frouin | ........................... | 370/230 |
| 6,975,654 B1 * | 12/2005 | Domon | .......................... | 370/509 |

(Continued)

FOREIGN PATENT DOCUMENTS

EP    1 357 705 A1    10/2003

OTHER PUBLICATIONS

"IEEE Standard for a High Performance Serial Bus", Microprocessor and Microcomputer Standards Committee of the IEEE Computer Society, IEEE Standard 1394-1995,1996. pp. 1-384.

(Continued)

*Primary Examiner* — Chi H. Pham
*Assistant Examiner* — Kevin Mew
(74) *Attorney, Agent, or Firm* — Fitzpatrick, Cella, Harper & Scinto

(57) ABSTRACT

A method of transmission of at least one data content by a source node associated with a generator application to at least one destination node, each associated with a consumer application, in a communications network comprising a plurality of nodes, each being associated with an application, the network implementing a first clocking which defines a first cycle, called a network cycle, for data transmission on said network.

Each node of the network implements a second clocking which defines a second cycle, called a local cycle, for data transmission between the node of the network and its associated application, the network cycle being equal to an integer multiple P, P≧1, of the local cycle, the start of the network cycle coinciding with the start of a local cycle, the local cycle comprising a plurality of virtual channels corresponding to time slots, a set of the virtual channels being assigned to the transmission of the content or contents.

22 Claims, 18 Drawing Sheets

U.S. PATENT DOCUMENTS

| | | |
|---|---|---|
| 7,075,937 B1 | 7/2006 | El Kolli .................. 370/395.65 |
| 7,099,322 B1 | 8/2006 | Frouin et al. ................. 370/390 |
| 7,298,744 B1 * | 11/2007 | Suh et al. ...................... 370/393 |
| 7,330,482 B2 * | 2/2008 | Boumendil et al. .......... 370/458 |
| 7,830,856 B2 * | 11/2010 | Boetzel et al. ................ 370/345 |
| 7,912,081 B2 * | 3/2011 | Heidari-Bateni et al. .... 370/443 |
| 2001/0024455 A1 * | 9/2001 | Thaler et al. .................. 370/503 |
| 2001/0030978 A1 | 10/2001 | Holloway et al. ............. 370/503 |
| 2003/0185174 A1 | 10/2003 | Currivan et al. .............. 370/335 |
| 2004/0052274 A1 * | 3/2004 | Wang et al. ................... 370/468 |
| 2004/0057411 A1 * | 3/2004 | Straub et al. ................. 370/338 |
| 2005/0078671 A1 | 4/2005 | Bizet et al. ................... 370/389 |
| 2007/0086473 A1 * | 4/2007 | Lin et al. ....................... 370/445 |
| 2007/0133612 A1 * | 6/2007 | Hatanaka ....................... 370/503 |
| 2007/0153674 A1 * | 7/2007 | Alicherry et al. ............. 370/216 |
| 2008/0080548 A1 * | 4/2008 | Mullendore et al. .......... 370/442 |
| 2008/0137674 A1 * | 6/2008 | Sandstrom .................... 370/404 |

OTHER PUBLICATIONS

"Consumer audio/video equipment—Digital interface—Part 4: MPEG2-TS data transmission", International Electrotechnical Commission, IEC 61883-4, second edition, Aug. 2004, pp. 1-12.

* cited by examiner

Fig. 11

| | Chunk 0 | ... | Chunk M |
|---|---|---|---|
| Node 0 | 0/1 | ... | 0/1 |
| Node 1 | 0/1 | ... | 0/1 |
| ... | ... | ... | ... |
| Node N-1 | 0/1 | ... | 0/1 |

906

METHODS OF TRANSMITTING AND RECEIVING DATA CONTENT IN A COMMUNICATIONS NETWORK, AND CORRESPONDING COMPUTER-READABLE STORAGE MEDIA AND DEVICES

1. FIELD OF THE INVENTION

The field of the invention is that of the transmission of data contents in a communications network.

The invention relates especially to the transmission of contents in a synchronous wireless network and more particularly to the transmission of contents in a 60 GHz radio transmission system.

The 60 GHz radio transmission systems are particularly well suited to the transmission of data at very high bit rates over short distances. For example, a transmission system of this kind is well suited to connectivity between the different elements of a "home cinema". In these cases of use, the range of the transmission is limited to some tens of meters but the bit rates involved are very high, sometimes above one gigabit per second because of the nature (both audio and video) and the high resolution of the information transmitted. In order to limit the power needed for data transmission in a 60 GHz radio system, it is preferable to use electronically steerable antennas. These antennas are actually electromagnetic point matrices activated so as to define an angle (or orientation) of data transmission and/or reception.

In such a communications network, it is necessary to be able to simultaneously support several concurrent audiovisual applications synchronously. Such a network is for example:
- a home cinema with wireless speakers (point-to-multipoint type network);
- a network based on multiple video sources connected to a display device (multipoint-to-point type network);
- a network based on multiple video sources connected to multiple display devices (multipoint-to-multipoint type network).

2. PRIOR ART SOLUTIONS

In order to be able to manage several concurrent audiovisual applications synchronously, the communications network must be capable of providing a fixed and determined latency time induced by the transmission of data from a source node to one or more destination nodes. For example, in the case of a home cinema application, a piece of audio data that has to be broadcast by several speakers must be presented by the communications network to the audio data-processing layers (or applications layers) of the speakers simultaneously. The communications network must also be capable of:
- reproducing the speed of sampling data at output of the destination nodes;
- synchronizing the presentation of data output from multiple destination nodes.

These prerequisites then make it necessary for:
- all the reference clocks of the nodes to be synchronized with one another;
- the transmission time in the network to be limited to a fixed and predetermined value;
- means to be implemented in order to present data at a predefined and precise point in time.

In the communications networks implementing concurrent synchronous applications, time stamping techniques are widely implemented in order to present the transmitted data to the data-processing layers (or applications) at predetermined and precise instance. In a simplified way, a time stamp is associated by the source device with each piece of data and is communicated to the destination nodes. After reception of the data and of the associated time stamp, the destination node can compare the value of its local clock with the value indicated in the time stamp and thus ensure the presentation of the data to the data-processing layers (or applications) at a precise point in time determined by the source. A time stamp technique of this kind is described for example in the IEC 611883-4 document <<Matériel audio/vidéo grand public—Interface numérique—Partie 4: Transmission de données MPEG2-TS>> (Large-Scale Consumption Audio/Video Equipment—Digital Interface—Part 4: MPEG2-TS Data Transmission).

However, time stamping has several drawbacks. First of all, it necessitates the introduction of additional data into each packet, leading to a reduction of the useful bandwidth and increasing the size of the reception buffer memories. Furthermore, time stamping necessitates additional processing means in order to compare the value of the local clock with the desired instant of presentation, means for synchronizing the different clocks of the nodes of the communications network in order that they make reference to a same absolute time. Such a reference to a same absolute time may be obtained for example by numbering of the clock cycles in using a synchronized cycle time register as defined in the IEEE 1394 standard "IEEE Standard for a High Performance Serial Bus, IEEE1394-1995" used as a complement to the above-mentioned IEC 61883 standard. A master node or cycle master then copies the value of its "Cycle Time Register" to those of the other nodes of the network through a cycle start packet, thus providing for the synchronization at constant phase of all the nodes of the network. All the nodes thus have a same time reference and, by data time stamping, they may provide for the presentation of the data transmitted to the data processing layers (or applications) at predetermined and precise instants.

It is then possible to provide for constant transmission time in a communications network by dividing a network cycle into fixed time slots or time intervals and by allocating a set of time slots for data communication to each node, which thus in turn transmits at predetermined times in a cycle of the communications network. A technique of this kind is known as TDM for "Time Division Multiplex" or TDMA ("Time Division Multiple Access") frequently used in wireless communications networks. However, a technique of this kind has drawbacks. In a communications network where a same destination node may be in simultaneous communication with several sources requiring a different antenna orientation depending on the transmitting source node, as may be the case in a 60 GHz radio transmission system, the "gap" or waiting time interval between one communications time slot and another becomes non-negligible in a cycle of the communications network, especially when the communications time slots are short.

The burst transmission mode is then particularly advantageous when the nodes of the network necessitate substantial antenna orientation time (as compared with the duration of a cycle of the network). In order to restrict the number of switching operations, the burst transmission mode enables the transmission of a large quantity of data in a same frame. Consequently, the time dedicated to switching operations is negligible as compared with the time dedicated to transmission/reception of data and the bandwidth of the network is thus efficiently used. However, such an approach cannot be used to obtain communications time slots per node that are short and precise to enable avoiding the use of data time stamping.

3. GOALS OF THE INVENTION

The invention, in at least one embodiment, is aimed especially at overcoming these drawbacks of the prior art.

More specifically, it is a goal of the invention, in at least one of its embodiments, in a communications network comprising several destination nodes receiving at least one data content, to provide a technique that enables the presenting at output from the destination nodes of at least one part of said at least one data content at a predetermined and precise instant, said technique not implementing any time stamping, said predetermined and precise instant being the same, when at least two destination nodes present the same part of the same data content at their output.

It is another goal of the invention, in at least one of its embodiments, to implement a technique of this kind by which the gap between each time slot and another of communications between the source nodes and the destination nodes of the network can be made negligible.

It is another goal of the invention, in at least one of its embodiments, to implement a technique of this kind that is compatible with a communications network implementing N-to-N type communications, namely multipoint-to-multipoint type communications.

It is another goal of the invention, in at least one of its embodiments, to implement a technique of this kind that can be implemented for one or more synchronous streams, each being associated with a determined sampling speed.

It is another goal of the invention, in at least one of its embodiments, to implement a technique of this kind that can be implemented for any type of synchronous stream at any sampling speed.

It is yet another goal of the invention, in at least one of its embodiments, to implement a technique of this kind that is simple to implement and costs little.

4. SUMMARY OF THE INVENTION

One particular embodiment of the invention proposes a method of transmission in which at least one data content is sent by a sender or source (or transmitter) node associated with a generator application to at least one destination node, the destination node or each destination node being associated with a consumer application, in a communications network comprising a plurality of nodes, the network implementing a first clocking which defines a first cycle, called a network cycle, for data transmission on said network.

According to the invention, the source node implements a second clocking which defines a second cycle, called a local cycle, for data transmission between each of said source and destination nodes and its associated application, said network cycle being equal to an integer multiple P, $P \geqq 1$, of the local cycle, the start of the network cycle coinciding with the start of a local cycle, the local cycle comprising a plurality of virtual channels corresponding to time slots, a set of said virtual channels being assigned to the transmission of said content or contents; and the source node performs the following steps:

concatenation of the data obtained from the generator application associated with said source node during the time slots corresponding to the virtual channels assigned to the transmission of said content or contents on a number P of consecutive local cycles, in order to form at least one concatenated data block;

sending on the communications network of said concatenated data block or blocks during a speech time assigned to said source node during a predetermined subsequent network cycle.

The general principle of the invention consists of the implementation, in the context of the transmission of at least one content in a communications network implementing a first clocking operation that defines a cycle, called a network cycle, of data transmission on the network, a second clocking operation that defines a cycle, called a local cycle (or TDM cycle), of data transmission within the nodes of the network, the network cycle being equal to an integer multiple P, $P \geqq 1$, of the local cycle (or cycle TDM), the start of the network cycle coinciding with the start of a local cycle (or TDM cycle), the local cycle (or TDM cycle) comprising a plurality of virtual channels corresponding to time slots, a set of said virtual channels being assigned to the transmission of the content or contents.

Furthermore, the source node performs the following steps:

concatenation of the data obtained from the generator application associated with said source node during each of the virtual channels assigned to the transmission of said content or contents on a number P of consecutive local cycles (or TDM cycles), in order to form at least one data block;

sending on the communications network of said concatenated data block or blocks during a speech time assigned to said source node during a predetermined subsequent network cycle.

Thus, as explained here below with reference to FIG. 2A, especially since the network cycle is a multiple of the local cycle (or TDM cycle) of each node of the network and because the pieces of data after concatenation on a predetermined set of local cycles (or TDM cycles) are sent out in a predetermined cycle, the invention in at least one of its embodiments provides a technique to ensure the presenting, at output of at least two of the nodes of the network, of at least one part of one of the data contents at a predetermined and precise instant, said technique not implementing any time stamping. This predetermined and precise instant is the same, when at least two destination nodes present the same part of the data content at their output.

Furthermore, such a technique is compatible with a communications network implementing multipoint-to multipoint type communications or point to multipoint type communications.

Furthermore, such a technique can be implemented for one or more synchronous streams, each being associated with a determined sampling speed, and may be implemented for any type of synchronous stream at any sampling frequency.

Preferably, the concatenation step is performed on a number P of consecutive local cycles coinciding with a network cycle.

The concatenation of the data is then done during a network cycle, enabling the transmission of the data blocks thus formed during the next network cycle whatever the position of the speech time of the source node in a data transmission sequence on the network.

Advantageously, the step of concatenation comprises a step of insertion of at least one piece of information, called padding information, when no piece of data is obtained from the generator application associated with said source node during the time interval or intervals corresponding to at least one of said virtual channels, called an empty virtual channel or virtual channels, allocated to the transmission of said content or contents.

For example, a node writes a symbol "null" (padding information) should there be no data sample obtained from the generator application in a virtual channel that had been assigned in write mode (i.e. a virtual channel designed for the transmission of data of one of the contents given by the generator application to the communications network). The introduction of such "null" symbols causes the duration of the local cycles (or TDM cycles) to be adapted to a wide spectrum of sampling frequencies used by the generator application while at the same time guaranteeing the delivery of the data to the consumer application at a precise and determined instant. A sampling frequency that is neither a multiple nor a sub-multiple of the clocking frequency of the local cycle (or TDM cycle) means that during certain time slots (or virtual channels), the generator application does not give data. When the source node generates a null symbol identifying a break in the data stream coming from the generator application, the destination node may however preserve the synchronization of the supply of data with the consumer application (using a frequency identical to the frequency used by the generator application) in reproducing the break identified in the data stream.

Preferably, a part of the padding information is of a size equal to the quantity of data that the source node may obtain during the time interval or time slots corresponding to said empty virtual channel or channels and said part of the padding information is inserted into one of said data blocks as if it had been received from the generator application during the vacant virtual channel channels.

The padding information (or a part of it) then has a size equivalent to that of the data transmitted during a virtual channel and gets inserted into the frame sent by the source node on the network, thus ensuring a constant size of frames sent out by the source node on the communications network, whatever the sampling frequency of the generator application, and hence facilitating the synchronization of the data stream with the consumer application by the destination node.

Advantageously, said concatenation step comprises a data interleaving step that performs a grouping, in order to form a container or chunk, by virtual channel of the data obtained from the generator application during the number P of consecutive local cycles.

The pieces of data are thus grouped according to their virtual channel used in the local cycle (or TDM cycle) of the source node (which is equivalent to the virtual channel used in the local cycle (or TDM cycle) of the destination node). It is then possible to apply error correction mechanisms by grouping (or container or chunk) thus obtained in order to prevent an error produced on the transmission network from affecting all the contents in transmission. In the context of a home cinema application, this enables a transmission error on the network to affect only the content of an audio channel restored by one speaker without affecting the contents of the audio channels restored by the other speakers.

The invention also relates to a method of reception of at least one data content by a destination node, associated with a consumer application, coming from at least one source node, each associated with a generator application, in a communications network comprising a plurality of nodes, the network implementing a first clocking which defines a first cycle, called a network cycle, for data transmission on said network.

According to the invention, the destination node implements a second clocking which defines a second cycle, called a local cycle, for data transmission between each of said source and destination nodes and its associated application, said network cycle being equal to an integer multiple P, $P \geq 1$, of the local cycle, the start of the network cycle coinciding with the start of a local cycle, the local cycle comprising a plurality of virtual channels corresponding to time slots, a set of said virtual channels being assigned to the transmission of said content or contents;

and the destination node performs the following steps:
reception from the communications network of at least one block of concatenated data during a speech time assigned to the at least one of said source nodes;
extraction, from the received block or block of concatenated data, of data associated with a virtual channel, called a virtual read channel, of said virtual channels assigned to the transmission of said content or contents;
from a predetermined subsequent network cycle, supply of the extracted data to the consumer application associated with the destination node, during the time slot corresponding to said virtual read channel, for the duration of a number P of consecutive local cycles.

Thus, the destination node receiving data blocks from the communications network provides data to the consumer application in a determined virtual channel (virtual channel assigned in read mode) and during a determined local cycle (or TDM cycle). The pieces of data then, between the time when the out tamed by the source node from the generator application and the time when they are given by the destination node to the consumer application, undergo a fixed and determined delay without any time-stamping information being used.

Advantageously, each destination node implements a step of detection of the presence, in said data block, of at least one piece of information, called padding information, associated with the at least one virtual channel assigned to the transmission of said content or contents, said pieces or pieces of padding information being not given to the consumer application during the supply step.

The destination node, upon detection of a piece of padding information associated with a given virtual channel, does not give the consumer application data during the given virtual channel and thus preserves the synchronization of the consumer application and of the generator application even if their sampling frequency is not a multiple or sub-multiple of the clocking frequency of the local cycle (or TDM cycle).

Preferably, a part of the padding information or pieces of padding information are of a size equal to the quantity of data that the destination node may provide during the time slot or time slots corresponding to the virtual channel or channels with which the padding information or pieces of padding information is or are associated.

The padding information (or a part of it) then has a size equivalent to that of the data transmitted during a virtual channel and is inserted into the frame sent by the source node on the network, thus ensuring a constant size of frames sent out by the source node on the communications network, whatever the sampling frequency of the generator application, and hence facilitating the synchronization of the data stream with the consumer application by the destination node.

Preferably, the destination node erases the piece or pieces of padding information during the time slots corresponding to the virtual channel or channels with which the piece or pieces of padding information are associated.

The pieces of data received during a network cycle can then be stored in a FIFO unit in the order in which they have to be sent during P local cycles (or TDM cycles) and the destination node, upon detection of the start of a virtual channel assigned in read mode, can extract the next available data from the FIFO, analyze it to find out if it corresponds to a piece of padding information and, if so, erase this data during the lapse of time of the virtual channel concerned, the next data are being thus ready for transmission to the consumer application at the next read-assigned virtual channel.

Advantageously, said extraction step comprises a step of de-interleaving of data, which identifies groupings, called chunks, by virtual channel, of data obtained from a generator application associated with one of said source nodes and which re-orders the data by local cycle of supply to the consumer application of the destination node.

The pieces of data are thus grouped according to their virtual channel used in the local cycle (or TDM cycle) of the source node (which is equivalent to the virtual channel used in the local cycle (or TDM cycle) of the destination node). It is then possible to apply error correction mechanisms by grouping (chunk) thus obtained in order to prevent an error produced on the transmission network form at affecting all the contents to be given by the destination node to the consumer application.

The invention also relates to a computer program product that can be downloaded from a communications network and/or recorded in a computer-readable support and/or executed by a processor comprising program code instructions for the implementation of the transmission method as described here above and/or of the reception method as described here above.

The invention also relates to a storage means, which may be totally or partially detachable, readable by a computer, storing a set of instructions executed on by said computer to implement the transmission method as described here above and/or the reception method as described here above.

The invention also relates to a source node associated with a generator application, said source node comprising means for sending at least one data content to at least one destination node, the destination node or each destination node being associated with a consumer application, in a communications network comprising a plurality of nodes, the network implementing a first clocking which defines a first cycle, called a network cycle, for data transmission on said network.

According to the invention, the source node implements a second clocking which defines a second cycle, called a local cycle, for data transmission between each of said source and destination nodes and its associated application, said network cycle being equal to an integer multiple P, $P \geq 1$, of the local cycle, the start of the network cycle coinciding with the start of a local cycle, the local cycle comprising a plurality of virtual channels corresponding to time slots, a set of said virtual channels being assigned to the transmission of said content or contents; and the transmission means comprise:
- means of concatenation of the data obtained from the generator application associated with said source node during the time slots corresponding to the virtual channels assigned to the transmission of said content or contents on a number P of consecutive local cycles, in order to form at least one concatenated data block;
- means for the sending, on the communications network, of said concatenated data block or blocks during a speech time assigned to said source node during a predetermined subsequent network cycle, the concatenation means being activated on a number P of consecutive cycles coinciding with the network cycle.

Advantageously, the concatenation means comprise means of insertion of at least one piece of information, called padding information, when no piece of data is obtained from the generator application associated with said source node during the time slot or slots corresponding to at least one of said virtual channels, called an empty virtual channel or virtual channels, allocated to the transmission of said content or contents.

Preferably, a part of the padding information is of a size equal to the quantity of data that the source node may obtain during the time slot or time slots corresponding to said empty virtual channel or channels and the source node comprises means for the insertion of said part of the padding information into one of said data blocks as if it had been received from the generator application during the vacant virtual channel channels.

Advantageously, the concatenation means comprises a data interleaving means that perform a grouping, in order to form a chunk, by virtual channel, of the data obtained from the generator application during the number P of consecutive local cycles.

The invention also relates to a destination node, associated with a consumer application, the destination node comprising means of reception of at least one data content coming from at least one source node, each associated with a generator application, in a communications network comprising a plurality of nodes, the network implementing a first clocking which defines a first cycle, called a network cycle, for data transmission on said network.

According to the invention, the destination node implements a second clocking which defines a second cycle, called a local cycle, for data transmission between each of said source and destination nodes and its associated application, said network cycle being equal to an integer multiple P, $P \geq 1$, of the local cycle, the start of the network cycle coinciding with the start of a local cycle, the local cycle comprising a plurality of virtual channels corresponding to time slots, a set of said virtual channels being assigned to the transmission of said content or contents;
and the reception means comprise:
- means of reception from the communications network of at least one block of concatenated data during a speech time assigned to the at least one of said source nodes;
- means of extraction, from the received block or block of concatenated data, of data associated with a virtual channel, called a virtual read channel, of said virtual channels assigned to the transmission of said content or contents;
- means for the supply, from a predetermined subsequent network cycle, of the extracted data to the consumer application associated with the destination node, during the time slot corresponding to said virtual read channel, for the duration of a number P of consecutive local cycles.

The advantages of the computer program product, storage means, source node and destination node are substantially the same as those of the method of transmission and reception as described here above.

Preferably, the destination node comprises means of detection of the presence, in said data block, of at least one piece of information, called padding information, associated with the at least one virtual channel assigned to the transmission of said content or contents, said pieces or pieces of padding information being not given to the consumer application by the supply means.

Preferably, a part of the padding information or pieces of padding information are of a size equal to the quantity of data that the destination node may provide during the time slot or time slots corresponding to the virtual channel or channels with which the padding information or pieces of padding information is or are associated.

Preferably, the destination node comprises means of erasure of the piece or pieces of padding information during the time slots corresponding to the virtual channel or channels with which the piece or pieces of padding information are associated.

Advantageously, the extraction means comprise data de-interleaving means, said de-interleaving means comprising means of identification of groupings, called chunks, by virtual channel, of data obtained from a generator application associated with one of said source nodes and means enabling the re-ordering of the data by local cycle of supply to the consumer application of the destination node.

5. LIST OF FIGURES

Other features and advantages of the invention shall appear from the following description of a preferred embodiment of the invention given by way of a non-restrictive indication and from the appended drawings, of which:

FIG. 1 is the drawing of a communications network in which it is possible to implement transmission and reception methods according to a particular embodiment compliant with the invention;

FIGS. 2A and 2B present examples of graphs of the progress in time of audio data samples in the WSC node and in a WAS node of the network of FIG. 1 according to the particular embodiment of the invention;

Figure 8:
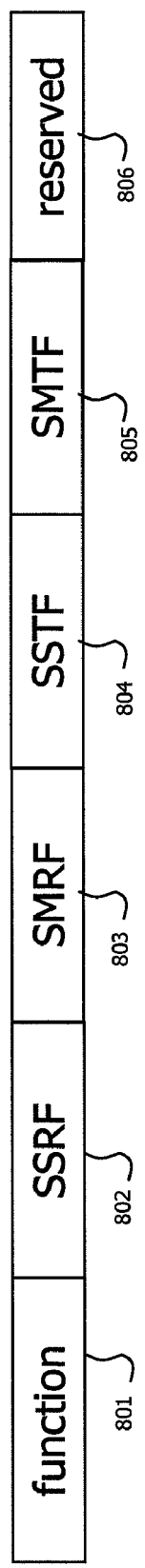
Figure 9:
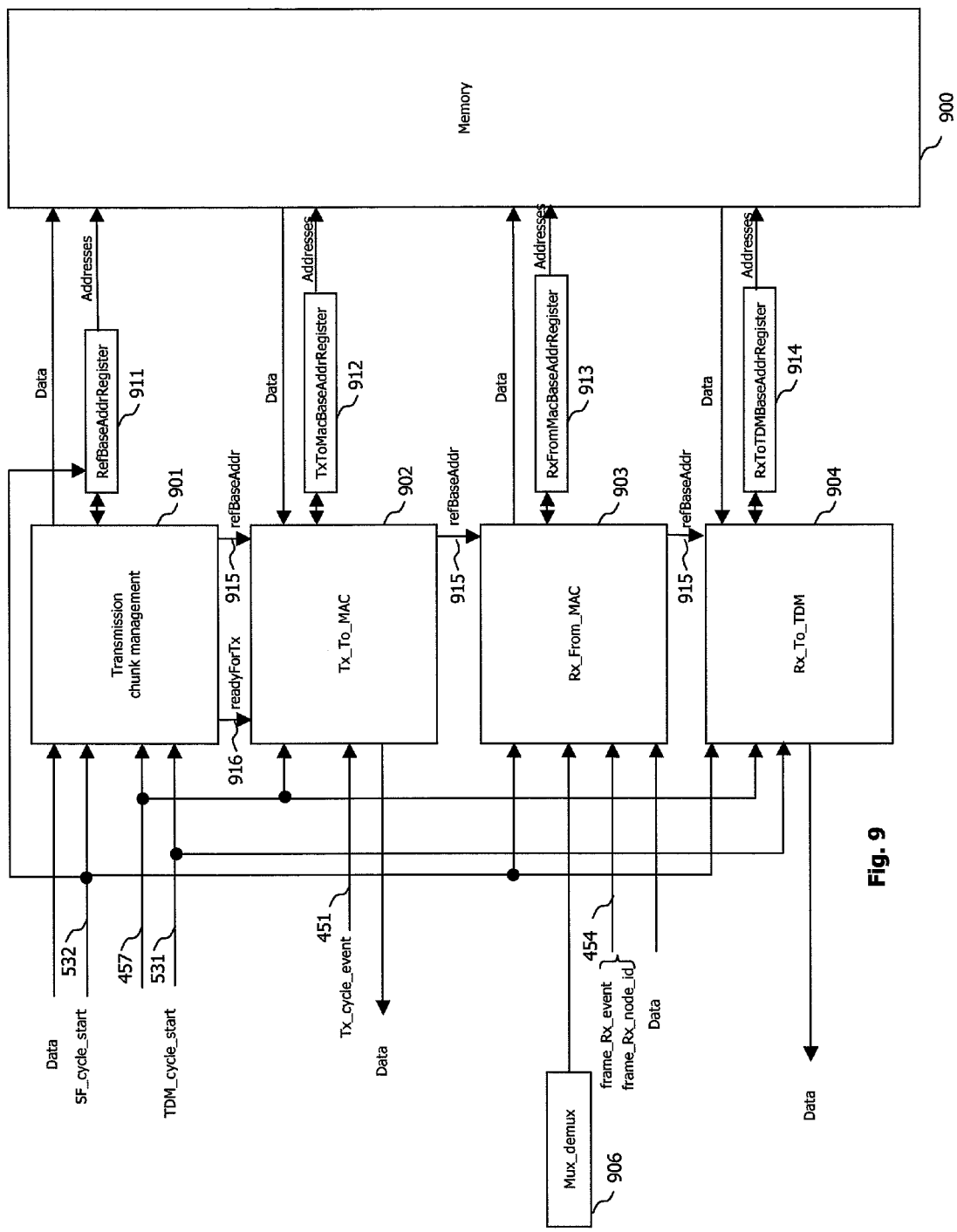
Figure 10:
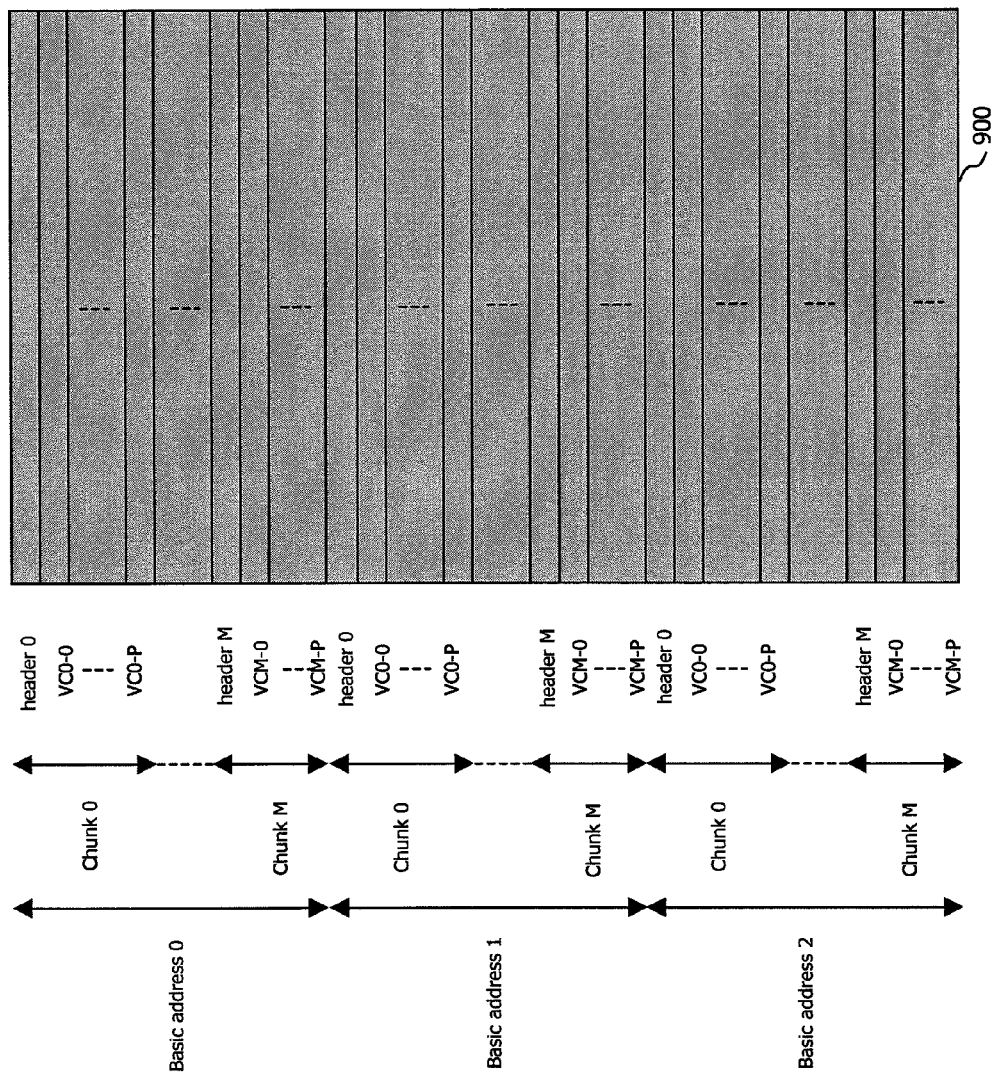
Figure 12:
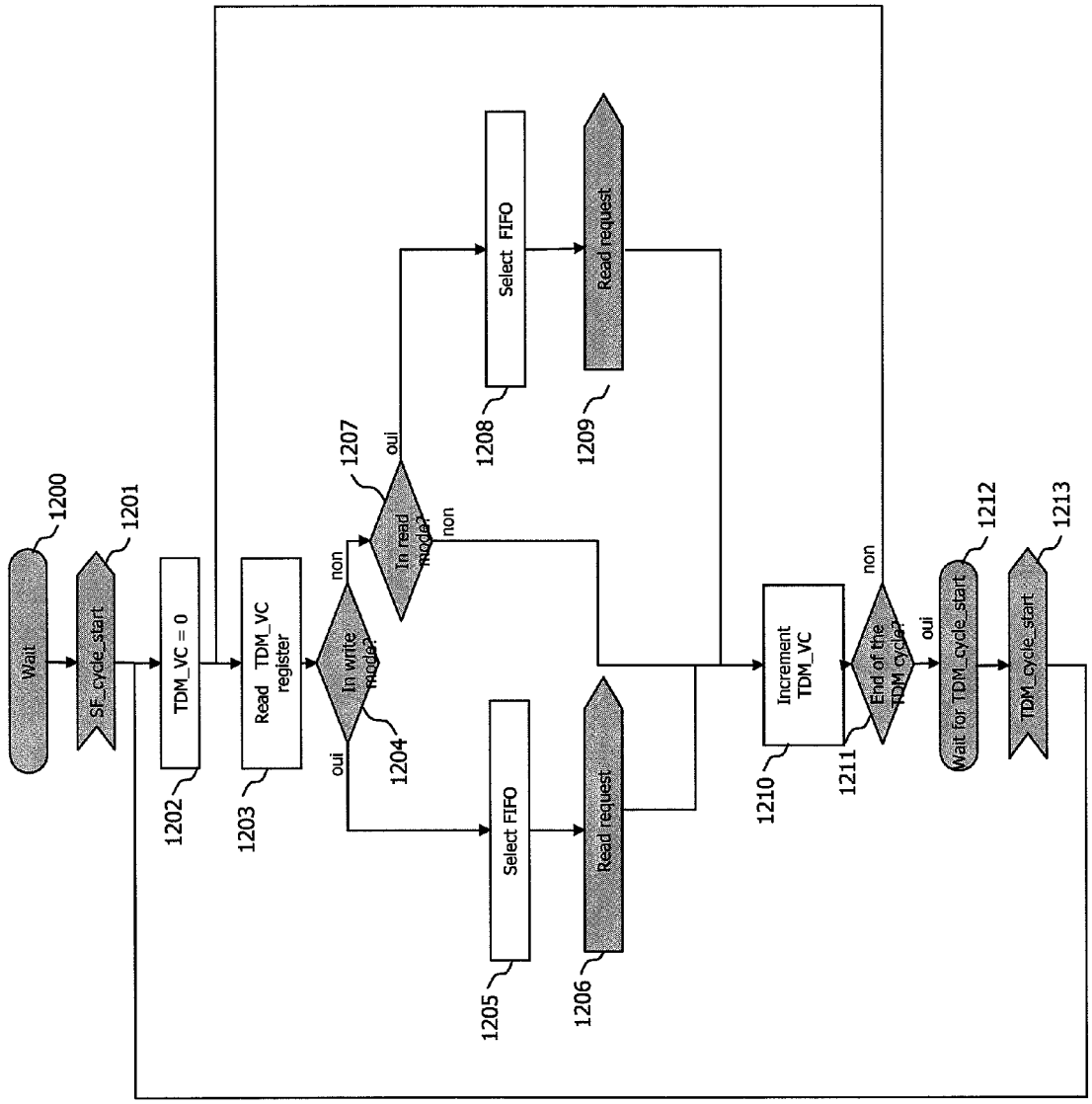
Figure 13B:
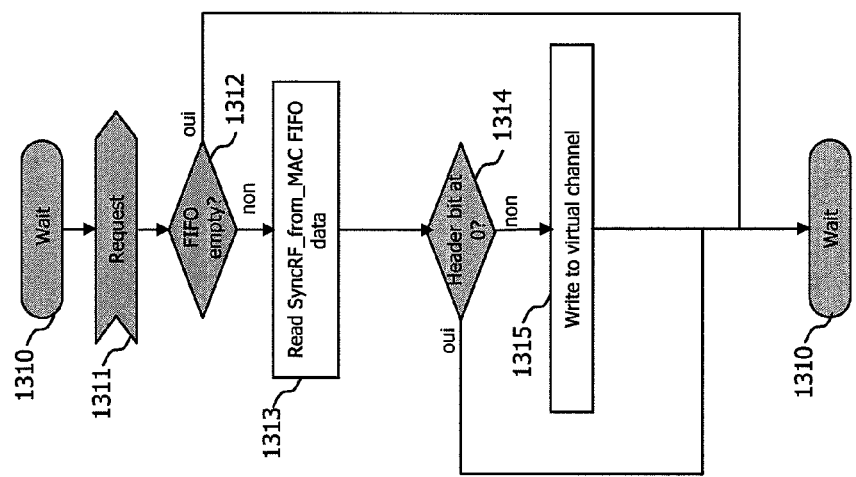
Figure 13A:
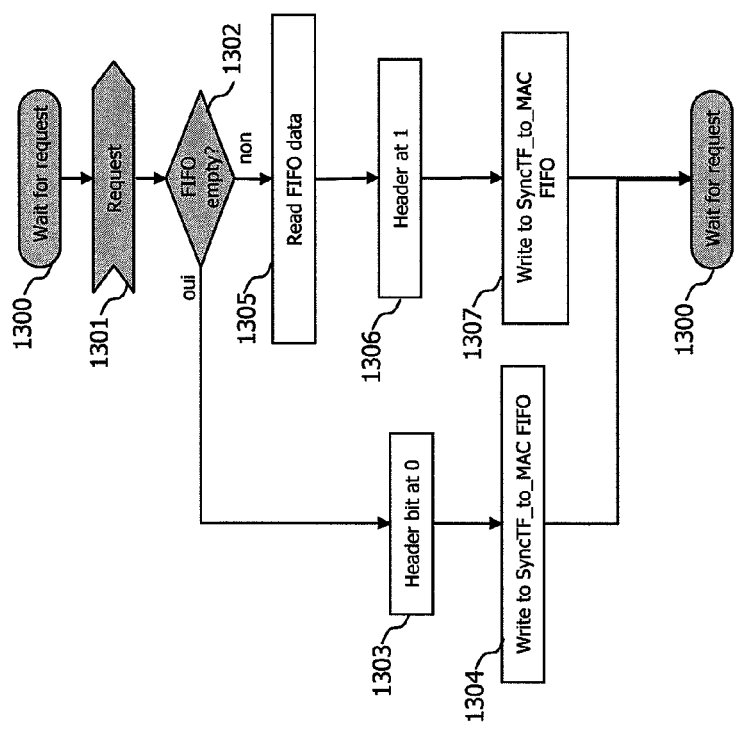
Figure 14:
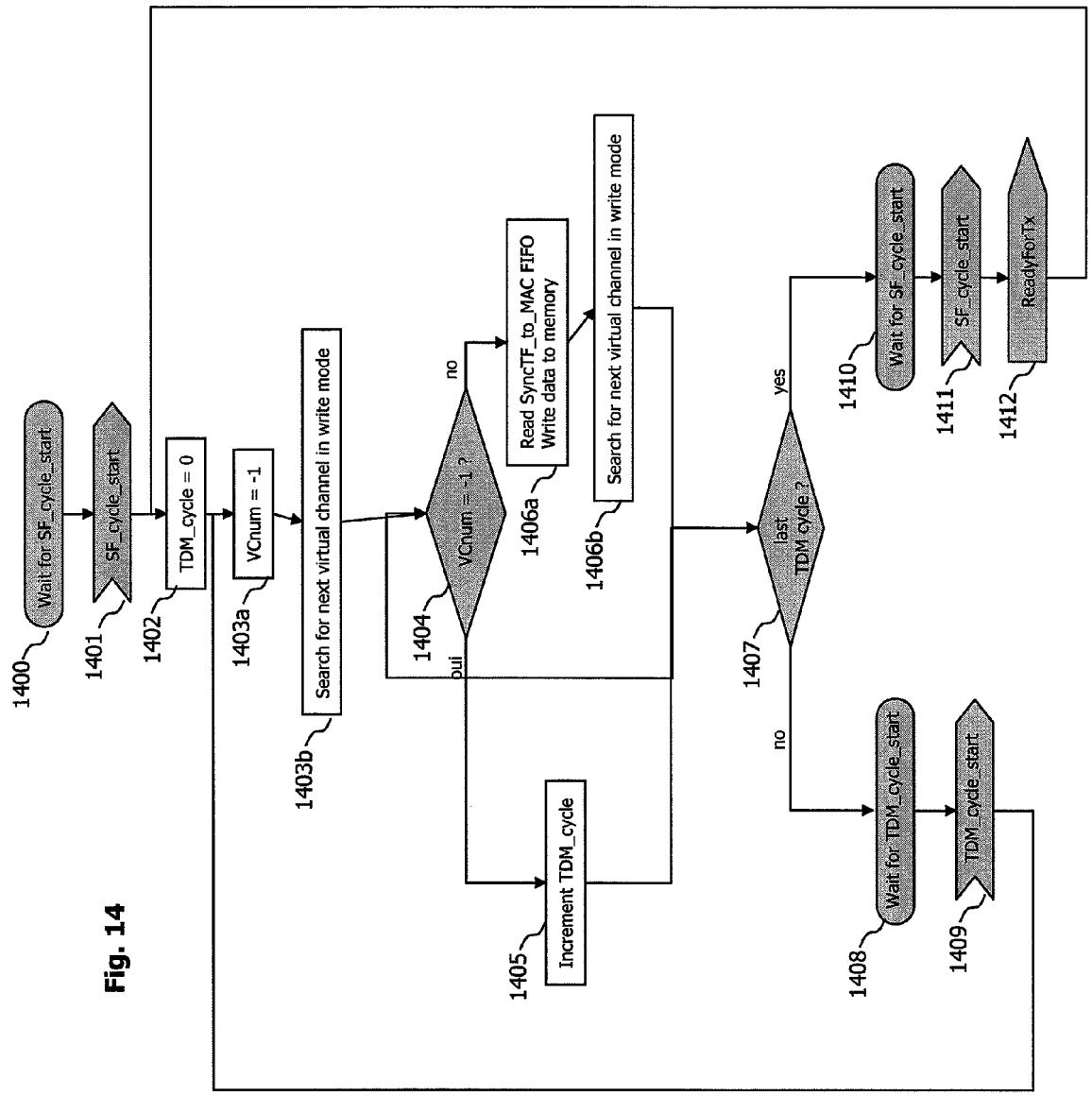
Figure 15:
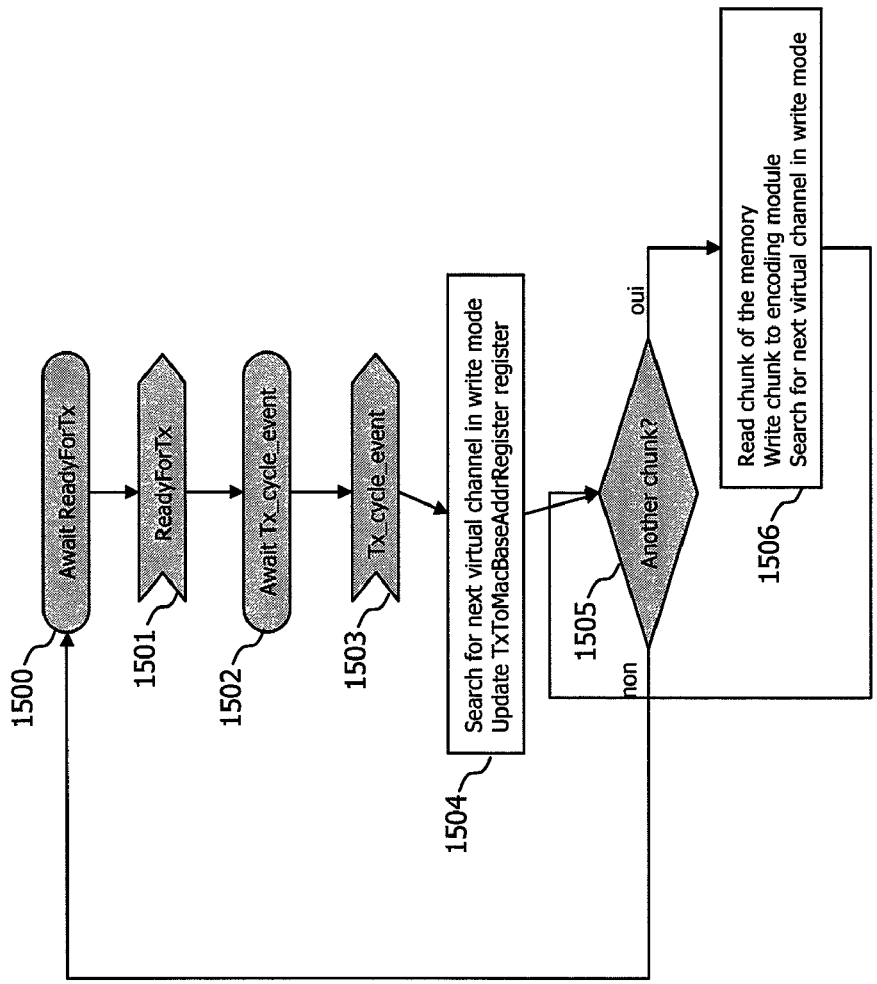
Figure 16:
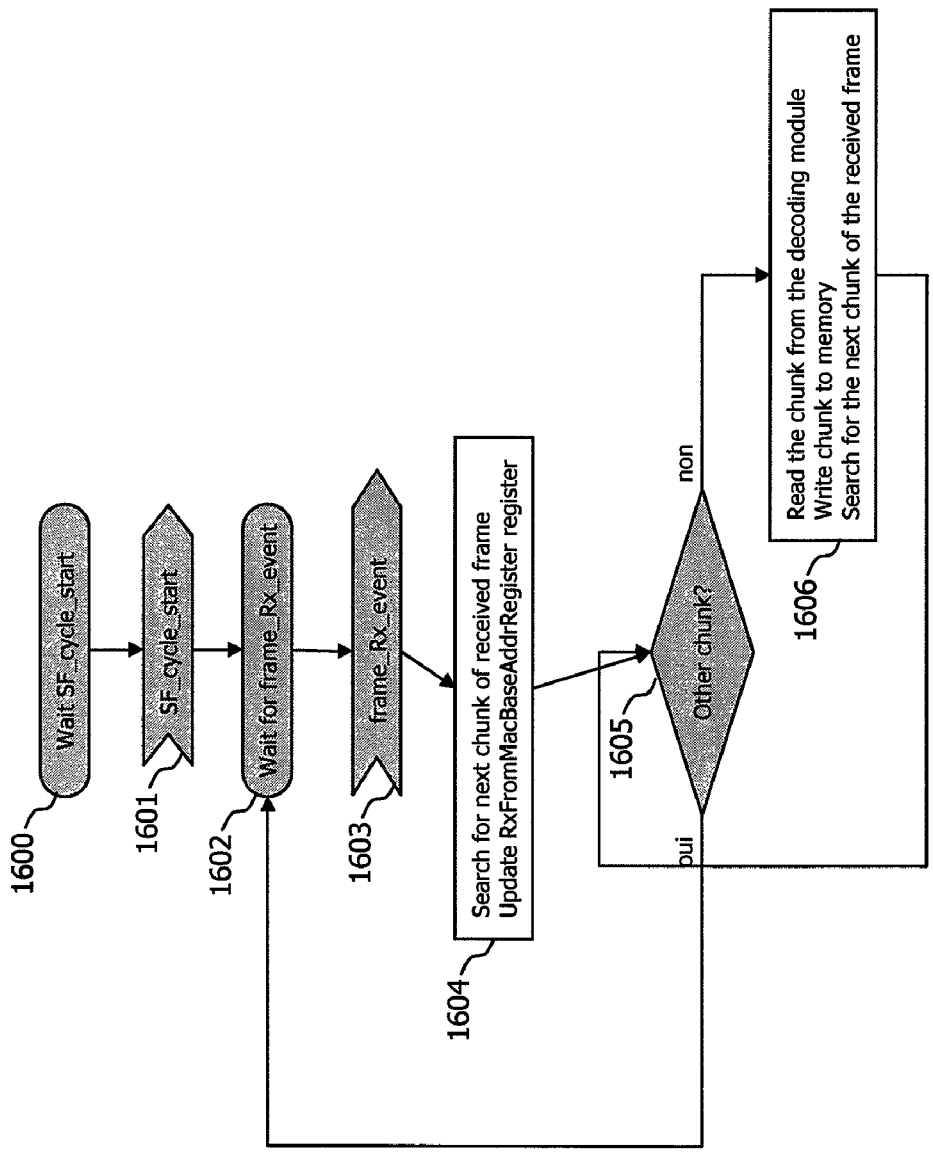
Figure 17:
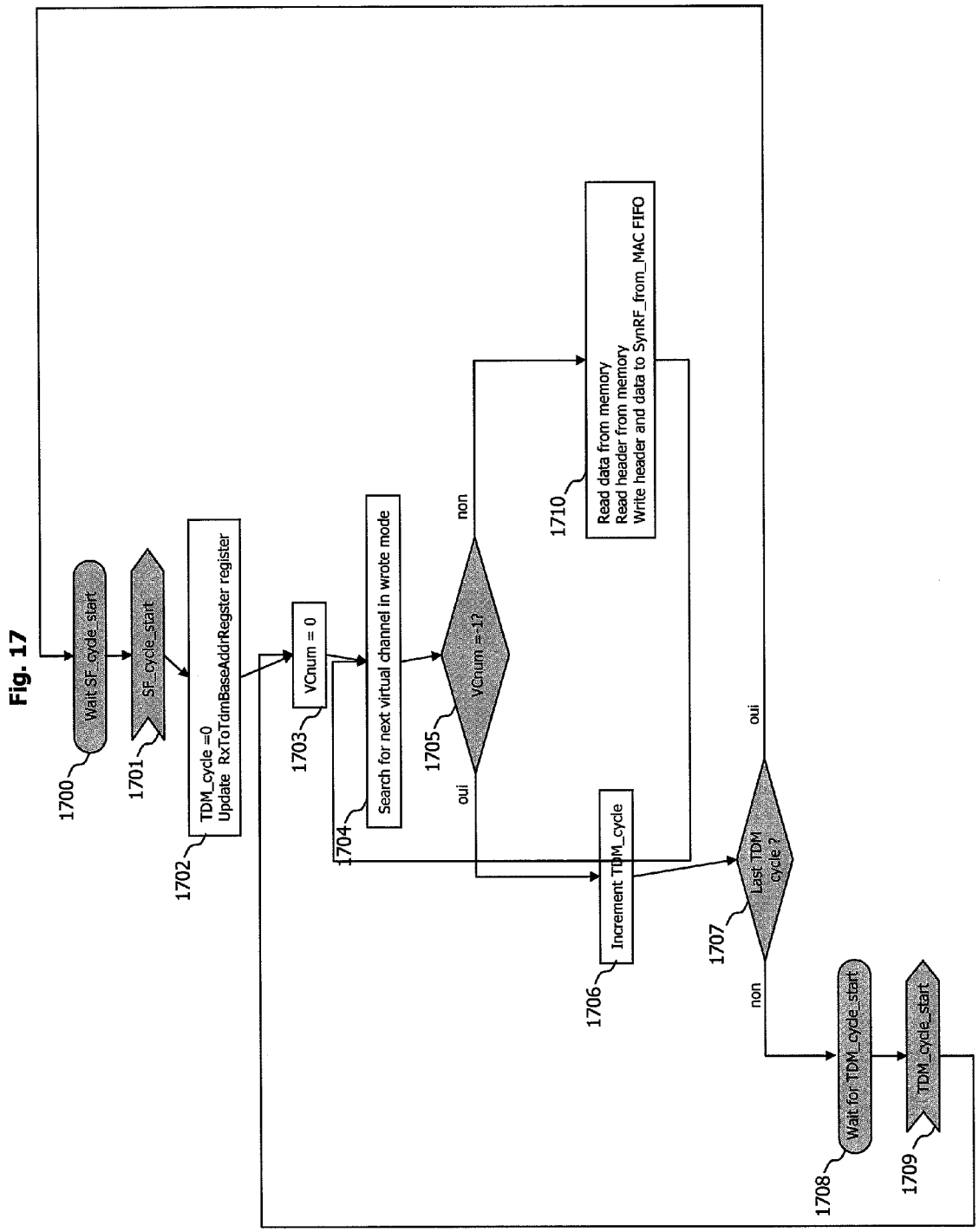

FIG. 8 presents an exemplary architecture of the TDM distribution register (TDM_MAP register) according to the particular embodiment of the invention;

FIG. 9 presents an example of architecture of the MAC 428 adapter according to the particular embodiment of the invention;

FIG. 10 presents an example of architecture of the memory 900 according to the particular embodiment of the invention;

FIG. 11 presents an example of the architecture of the multiplexing/demultiplexing "mux_demux" registers of the chunks according to the particular embodiment of the invention;

FIG. 12 presents the main steps of a processing algorithm performed by the TDM bus manager on the period of a cycle network according to the particular embodiment of the invention;

FIGS. 13A and 13B present the main steps of processing algorithms performed by the device for the insertion of "null" values (FIG. 13A) and by the device for the analysis of "null" values (FIG. 13B) according to the particular embodiment of the invention;

FIG. 14 presents the main steps of a processing algorithm performed by the module for the management of chunks in transmission of the MAC adapter according to the particular embodiment of the invention;

FIG. 15 presents the main steps of a processing algorithm performed by the module for transmission to the MAC layer of the MAC adapter according to the particular embodiment of the invention;

FIG. 16 presents the main steps of a processing algorithm performed by the module for reception from the MAC layer of the MAC adapter according to the particular embodiment of the invention;

FIG. 17 presents the main steps of a processing algorithm performed by the module for reception to the TDM bus of the MAC adapter according to the particular embodiment of the invention.

6. DESCRIPTION OF AN EMBODIMENT OF THE INVENTION

Figure 1:
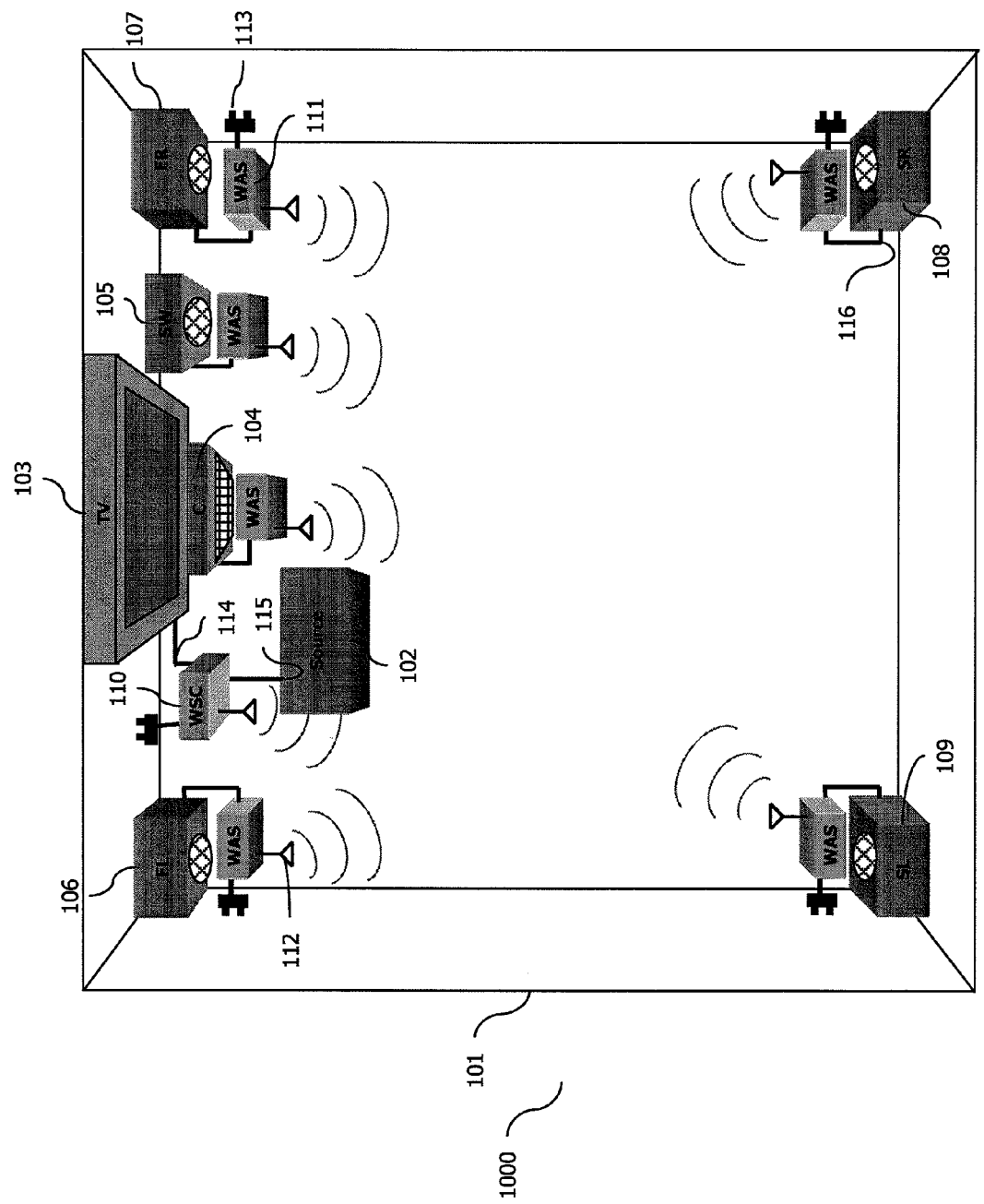

According to a particular application of the methods of transmission and reception according to one particular embodiment of the invention, the following description is situated in the context of a communications network 1000 which is a 5.1 type home cinema or home theatre network illustrated in FIG. 1. Naturally, the invention can also be applied in the context of a 7.1 type home cinema network.

Naturally, the method according to at least one other embodiment of the invention can also be implemented in any communications network in which it is necessary to simultaneously implement several concurrent synchronous applications such as, for example, one of the following networks:
 a network based on multiple media sources connected to a display device (multipoint-to-point type network);
 a network based on multiple media sources connected to multiple display devices (multipoint-to-multipoint type network).

In the context of the 5.1 home cinema network 1000, the speakers are connected to the audio source by means of a meshed wireless network 101.

The 5.1 home cinema network 1000 comprises an audio-video source terminal 102 (for example a DVD reader), a television screen 103, a first speaker 104, called a center speaker 104, a second speaker 105, called a subwoofer 105, a third speaker 106, called a front-left speaker 106, a fourth speaker 107, called a front-right speaker 107, a fifth speaker 108, called a right ambience speaker 108 and a sixth speaker 109, called a left ambience speaker 109. Each speaker plays one of the six audio channels delivered by the source terminal 102.

In order to make the meshed wireless network 101, the invention implements a wireless ambience controller 110 here below called a WSC ("Wireless Surround Controller") node 110 and first, second, third, fourth, fifth and sixth active wireless nodes 111, hereinafter called WAS nodes (for "Wireless Active Speaker") 111, each being associated with one of the above-mentioned speakers.

The function of a WAS node 111 is to set up an interface between the speaker with which it is associated and the WSC node 110 in the wireless meshed node 101. Each WAS node 111 is connected to the speaker with which it is associated by a coaxial cable 116. For a given WAS node 111, depending on the location of the amplifier and of the digital/analog converters (in the WAS node or in the speaker), the cable 116 conveys digital or analog audio signals.

The WAS node 111 and the WSC node 110 are each powered by a power connector 113 (this power connector is not represented for each of the nodes 110, 111 in FIG. 1) and each of them comprises one antenna 112 in order to implement wireless communications. The antenna 112 is preferably an electronically controlled electromagnetic antenna.

The WSC node 110 receives audio-video streams transmitted by the audio-video source terminal 102 by means of a cable 115 and then, by means of a wireless communication, it transmits digital video data coming from the received audio-video streams to all the speakers and, through a cable 114, it transmits digital video data from the received audio-video streams to the television screen 103. For example, the cables 114 and 115 are HDMI ("High Definition Multimedia Interface") protocol compliant cables. The source terminal 102 or the WSC node 110 comprise an audio channel decoder in order to identify and separate the audio data samples of each channel. Furthermore, they include an ambience processor to apply modifications to the audio samples as a function of the acoustic characteristics of the room.

In order to improve the compactness of the system, the WSC node 110 may be integrated into the source terminal 102 and each WAS node 111 may be integrated into the speaker with which it is associated.

In the present network 1000, the following time constraints are critical:
  the relative time lag between the audio signal and the video signal coming from a same audio-video content must be minimized:
  the relative time lag between transmission from the different speakers (between the audio channels) must be minimized.

The relative time shift between the audio signal and the video signal coming from a same audio-video content, generally called "lip synchronization", must be minimized. For the user's comfort, the relative time lag between the audio signal and the video signal must remain within the interval ranging from −30 ms to +100 ms. In the case of wireless connections, the radio transmitters/receivers add time lags due to transmission. The audio signal is thus offset relative to the video signal. If this offset becomes greater than hundred milliseconds, then it is necessary to delay the video signal at output of the source terminal 102.

In the home cinema network 100, the distance between the listening stations for the user and the speaker generally varies according to the speaker considered. Owing to the speed of propagation of sound in the air (approximately 343 m/s), the time of propagation of the sound wave from the speaker to the listening station is different for each audio channel. For example, a difference in propagation path of 34 cm between two audio channels implies are time lag of 1 ms at reception between the two audio channels. Thus, in order to preserve acceptable relative time lags (i.e. lower than 100 μs), most of the home cinema systems implement a mechanism of automatic compensation for these time lags.

At the installation of the meshed network 101, particular attention must be paid to compliance with time constraints. The present invention ensures that the transmission time in the network is fixed. Furthermore, in the context of the network 1000, compensation for time lags due to the effects of distance is obtained at output of the WAS 111.

Thus, each WAS node 111 simultaneously delivers an audio sample at its consumer (receiver) application layer, this audio sample coming from a generator (or sender) application of the WSC 110 after a delay that is fixed and common to the WAS nodes. The compensation for the time lags due to the effects of distance is achieved in each WAS node before entry into the amplification stage.

In the network 1000 of this FIG. 1, a 1 to N (N=6) type communication (i.e. point-to-multipoint type communication) is made from the WSC node 110 to the six WAS nodes 111. Advantageously, the WSC node and the WAS node are each capable of sending (or transmitting) and receiving data thus enabling N to N, i.e. multipoint-to-multipoint type communication to be set up.

The following description is situated in the context of the broadcasting, in the network 1000 and via the WSC node, of an application, for example an audio content.

The transmission and reception methods of the invention (described in greater detail with reference to FIGS. 12 to 18) are implemented in the form of a software program and/or a plurality of software sub-programs (comprising a plurality of algorithms described here below) executed in several machines of the network 1000, for example in the WSC node 110 and the WAS nodes 111.

Figure 2A:
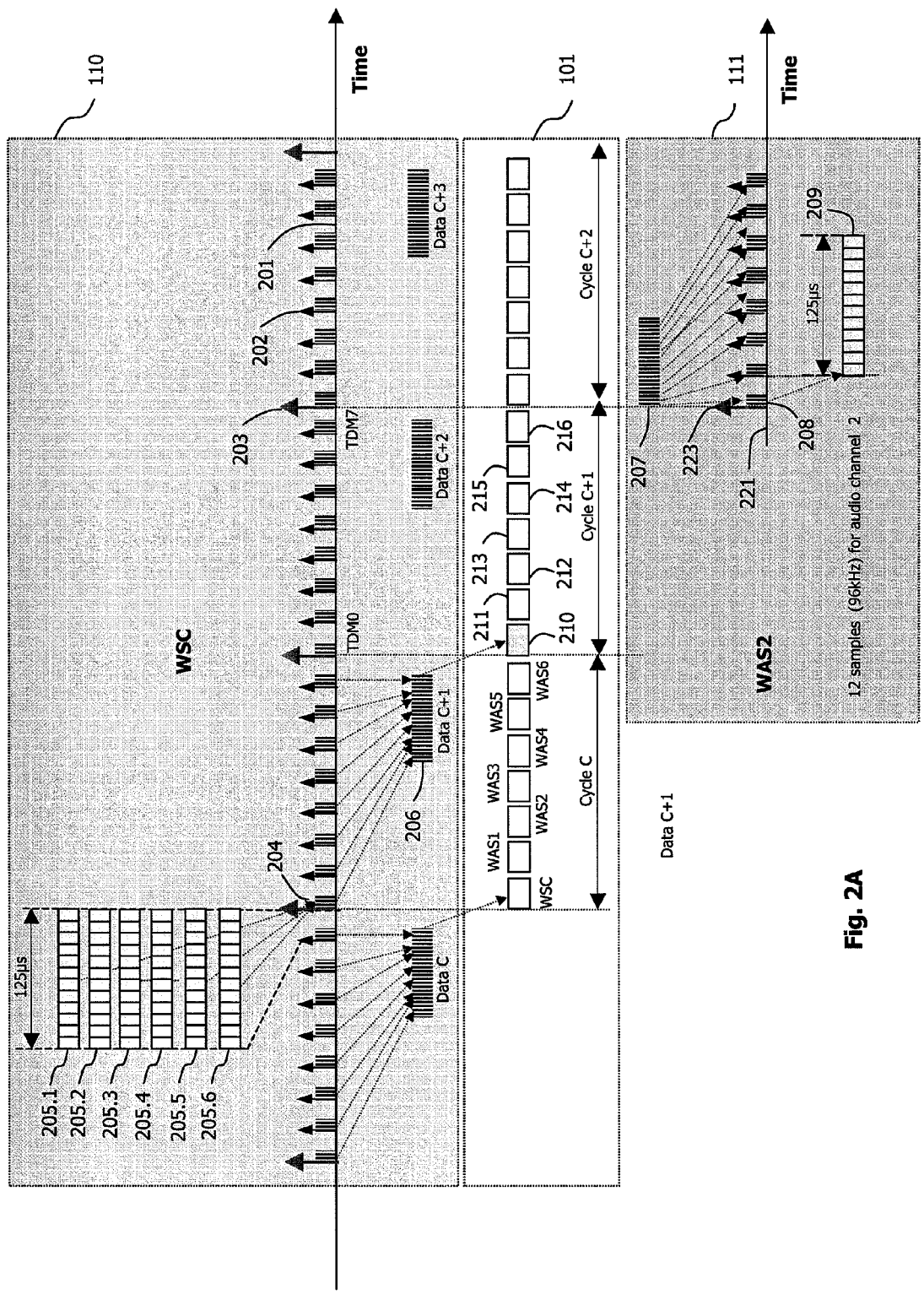
Figure 2B:
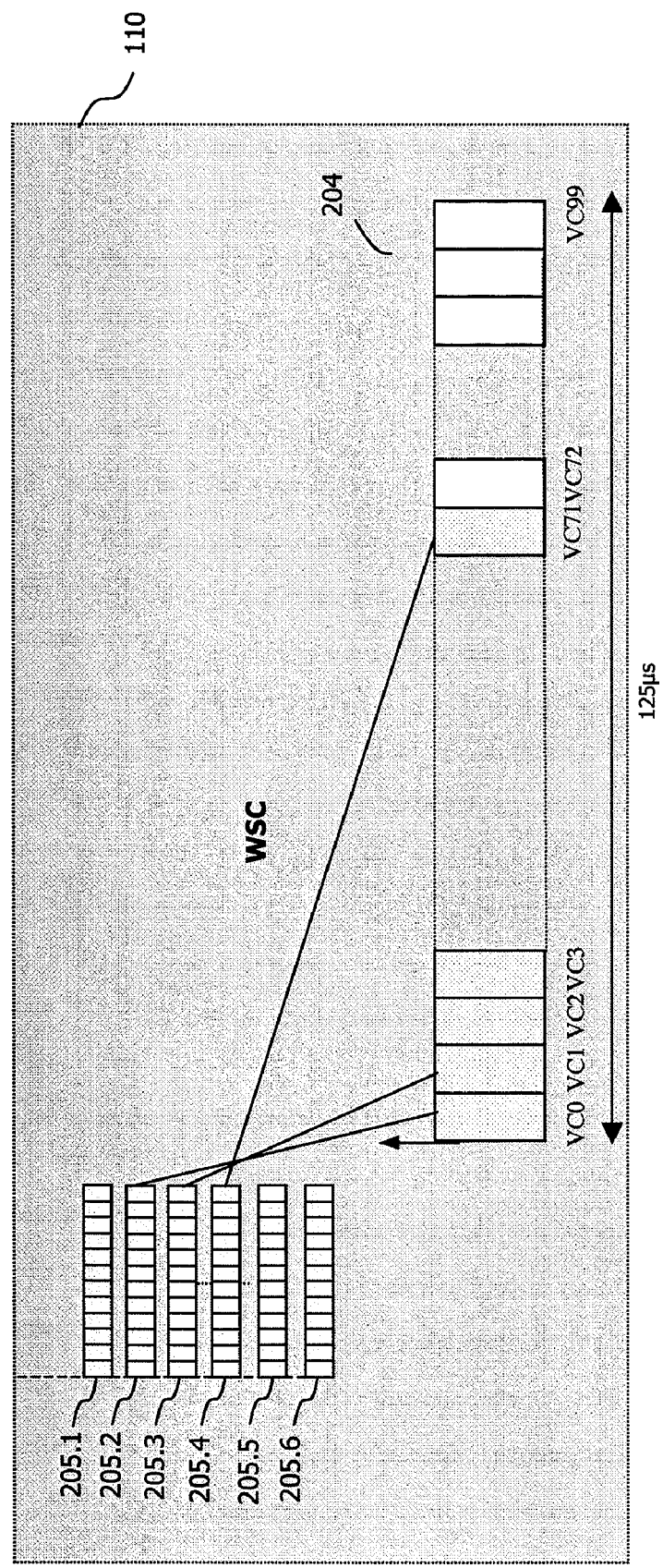

Referring to FIGS. 2A and 2B, examples are provided of graphs of the temporal progress of samples of audio data in the WSC node 110 and in a WAS node 111 of the network 1000 of FIG. 1.

As shown in FIG. 2A (providing a comprehensive illustration on the entire network 1000 of the methods of transmission and reception according to the invention), the WSC node 110 generates the clocking of a first TDM ("Time Division Multiplexing") bus 201 represented on a time axis. In the context of this first TDM bus, TDM cycle start events are represented by arrows 202 and the cycle start identification events (network cycle) for transmission on the wireless mesh network 101 are represented by arrows 203. In this FIG. 2, among the WAS nodes 111 comprising the first node WAS1, second node WAS2, third node WAS3, fourth node WAS4, fifth node WAS5 and sixth node WAS6, only the second WAS node WAS2 is represented; it generates the clocking of a second TDM bus 221.

Each of the WAS nodes, namely the first node WAS1, second node WAS2, third node WAS3, fourth node WAS4, fifth node WAS5 and sixth node WAS6 is each associated respectively with a first audio channel (here below referenced channel 1), second canal audio (here below referenced channel 2), third audio channel (here below referenced channel 3), fourth audio channel 4 (here below referenced channel 4), fifth audio channel (here below referenced channel 5) and sixth audio channel (here below referenced channel 6). It must be noted that, in the case of a home cinema application, a same audio channel can be transmitted to two speakers (for a simple "surround" effect).

Each network cycle start identification event 223 in the second TDM bus 221 of the node WAS is synchronized with the network cycle start identification event of the first TDM bus 201 in the WSC node 110. In these examples, there are eight TDM cycles referenced TDM0 to TDM7 during one cycle of the wireless mesh network 101, whose start is marked by a network cycle start.

A super-frame in the wireless mesh network 101 comprises seven MAC frames 210 to 216, each corresponding to a sending of data by one of the nodes WSC, WAS1, WAS2, WAS3, WAS4, WAS5 and WAS6 in the meshed network 101 during a network cycle. A first MAC frame 210 is sent by the WSC node 110, a second MAC frame 211 is sent by the node WAS1, a third MAC frame 212 is sent by the node WAS2, a fourth MAC frame 213 is sent by the node WAS3, a fifth MAC frame 214 is sent by the node WAS4, a sixth MAC frame 215 is sent by the node WAS5 and a seventh MAC frame 216 is sent by the node WAS6.

In the WSC node 110, the audio samples for the audio channels referenced canal 1 to canal 6 are collected respectively in a first data stream transmission FIFO (First In First Out) 205.1 associated with the channel 1, a second data transmission FIFO 205.2 associated with the channel 2, a third FIFO 205.3 associated with the channel 3, a fourth FIFO 205.4 associated with the channel 4, a fifth FIFO 205.5 associated with the channel 5 and a sixth FIFO 205.6 associated with the channel 6.

In these examples, a TDM cycle (of one of the TDM buses, namely the first bus 201 and the second bus 221) has a fixed 125 μs duration and the audio sampling frequency is equal to 96 kHz. This means that, at each TDM cycle, there are 12 new audio samples per channel available in the FIFOs 205.1 to 205.6 of the WSC node 110.

As is illustrated more precisely in FIG. 2B (giving a particular illustration at the WSC node 110 of the transmission method of the invention), the WSC node 110 fills the TDM cycles 204 of the first bus 201 from data collected in the FIFOs 205.1 to 205.6. To do this, a TDM cycle (with a 125 μs duration) 204 is broken down into a certain number of virtual channels corresponding to time slots, for example 100 virtual channels VC0 to VC99; thus, taking for example a virtual channel capacity equal to the size of an audio sample (for example 24 bits), 72 of these virtual channels are pre-allocated or dedicated (according to a predetermined sequence stored in a TDM distribution TDM_MAP register, for example accessible to each of the nodes of the network 101, as indicated here below with reference to FIG. 4 and described here below with reference to FIG. 8) to an audio channel (either for a write operation or for a read operation). The remaining 28 virtual channels are free and could be used to transfer other data contents.

The term "read operation" for a channel within a communications node is an operation for obtaining a piece of data coming from the communications network and intended for a consumer application and the term "write operation" for a channel within a communications node is an operation for obtaining a piece of data coming from a generator application and intended for the communications network.

Thus, for the WSC node, the 72 virtual channels reserved for the audio content are read-allocated, whereas for each WAS node, 12 of these 72 virtual channels are write-allocated (each WAS node having one audio channel that it must cause to be reproduced by the speaker with which it is associated).

Thus, the predetermined sequence indicates for example that:
the first virtual channel VC0 of the cycle 204 is allocated to the second audio channel 2 associated with the second FIFO 205.2 and thus, during the virtual channel VC0, the WSC node retrieves a sample of the second FIFO 205.2;
the second virtual channel VC1 of the cycle 204 is allocated to the third audio channel 3 associated with the third FIFO 205.3 and thus, during the virtual channel VC0, the WSC node retrieves a sample of the second FIFO 205.3;
. . . ;
the 71st virtual channel VC71 of the cycle 204 is allocated to the fourth audio channel 4 associated with the fourth FIFO 205.4 and thus, during the virtual channel VC0, the WSC node retrieves a sample of the fourth FIFO 205.4.

Then, the WSC node retrieves the data written by the applications during the eight TDM cycles constituting one cycle of the mesh network 101, concatenates them (for example by means of an interlacing technique) in order to set up a concatenated set that it places in an internal memory 206. Then, these pieces of data are sent into a MAC frame 210 at the next speech time granted to the WSC node during the cycle C+1 of the mesh network 101. In the same way, each of these nodes WAS1 to WAS6 has a speech time allocated (or assigned) to it. During this speech time, the concerned node sends out a MAC frame (211 to 216 respectively). The speech time allocated (or assigned) to a node is defined by:
a start time which depends on the instant at which the node preceding it in the transmission sequence has stopped sending, to which there is added a waiting time interval or gap (to enable the reorientation of the antennas and compensate for the jitter inherent in the wireless network 101:
a duration, which depends on the number of pieces of data that the node must transmit (burst mode).

The concatenated packets sent by the WSC node are received by the set of nodes WAS1 to WAS6, each retrieving the data intended for it. For example, the WAS node2 places the above-mentioned concatenated packet 207, sent by the WSC node, in an internal memory 207 before distributing the data packets of this concatenated packet on the second TDM bus 221, and the data intended for it therefrom.

FIG. 2A illustrates especially the obtaining of the audio samples presented on the TDM bus during a cycle referenced C of the mesh network 101 and sent in burst mode by the WSC 110 during the next cycle referenced C+1. At the start of the first TDM cycle of the cycle referenced C+1 of the mesh network 101, the FIFOs 205.1 to 205.6 are read at the rhythm of the virtual write channels allocated in the TDM bus 201 and the set is transferred into the memory 206. This is repeated for 8 TDM cycles with new audio samples available in the FIFOs 205.1 to 205.6. At the end of the eighth TDM cycle of the cycle referenced C+1 of the mesh network 101, the memory 206 comprises the audio samples collected during the eight TDM cycles, which correspond to the duration of one cycle of the mesh network 101. It has, in all, 12 samples multiplied by six channels multiplied by eight TDM cycles, giving 576 audio samples.

At the next speech time given to the WSC node of the network cycle C+2, the WSC 110 sends a MAC frame 210 in the wireless mesh network 101. This MAC frame 210 comprises the above-mentioned 576 audio samples in its payload data.

Each WAS node and especially the WAS node2 receives the MAC frame 210 sent by the WSC node 110. The start instant for reception of the MAC frame 210 sent by the WSC gives an indication to the concerned WAS node of the start of a cycle of the mesh network 101. Each WAS node synchronizes the start of the next TDM of its TDM bus on this indication. The set of the TDM buses of the WAS nodes of the mesh network is thus synchronized with the clocking of the TDM bus of the WSC node 110.

In the present case, each WAS node is deemed to have received the MAC frames coming from the WSC node at the end of the network cycle C+1. FIG. 2A presents in particular a reception memory 207 included in the node WAS2 (each WAS node comprises an internal memory of this kind). This reception memory 207 comprises the data coming from the MAC frame 210 transmitted by the WSC node: 576 audio samples sent previously by the WSC node during the cycle C of the mesh network 101.

At the occurrence of a cycle start event 223 of the mesh network 101, each WAS node extracts the data coming from the previous network cycle and stored in the internal memory (for example the reception memory 207 for the node WAS2). As illustrated in FIG. 2, the node WAS2 uses the virtual read channels allocated to its TDM bus 221 in order to transfer the audio samples for the channel 2 from the reception memory 207 to a synchronous stream reception FIFO 209. The virtual read channels allocated to the TDM bus of a WAS for the transfer of data associated with a given audio channel correspond to the virtual write channels allocated to the TDM bus of the WSC 110 to transfer this same audio data from the given audio channel.

Thus, referring to FIG. 2B, the virtual channel VC1 of the TDM bus of the WSC 110 is assigned to the writing of the data of the audio channel 2 (retrieval of the data of the generator application) and the virtual channel VC1 of the TDM bus of the node WAS2 111 is assigned to the reading of the data of the audio channel 2 (presenting of data to the consumer application).

After the first TDM cycle of the network cycle C+3 (not shown) which succeeds the network cycle C+2 (not shown), the FIFO 209 comprises 12 new audio samples for the audio channel 2. These audio samples are ready to be delivered to the speaker (consumer application), with which the node WAS2 is associated, at the sampling speed of 96 kHz. This operation is repeated at each TDM cycle. When the application is started, each WAS waits for the first 12 audio samples coming from the first TDM read cycle to be present in the reception FIFO, then starts the transfer of data to the speaker at the start of the next TDM cycle. Consequently, each WAS node associated with a given channel can deliver the audio samples of the given channel to its speaker at a predetermined and precise incident identical for all the WAS nodes.

Thus, the present invention, in at least one of its embodiments is, is based on a mechanism of TDM or time division multiplexing of data bus cycles internal to the telecommunications nodes, for which the allocation of the read and write time slots is distributed over all the nodes of the communications network. Each node is clocked by a local clock, and the local clocks of the different nodes of the network being synchronized in phase and in frequency.

Each TDM cycle comprises an integer M (M being for example at least equal to the number of nodes on the network) of virtual channels, each being associated with a time slot dedicated to writing by a node. This condition ensures that each node has a least one reserved virtual channel in a TDM cycle in order to be able to introduce data into a TDM cycle in order to communicate on the mesh network 101. Furthermore, preferably, the time division multiplexing or TDM is sized (in terms especially of the number of virtual channels per TDM cycle and the size, in bits of the virtual channels) so as to be able to absorb the peak data bit rates of the network.

Preferably, during a TDM cycle, each node has:
a predetermined integer number X of virtual write channels to enter data ($X \geq 1$);
a predetermined integer number Y of virtual read channels to obtain data ($M \geq X+Y$).

Each node of the network, through a table of distribution of the channels permanently stored in a TDM distribution register or TDM map register TDM_MAP 415, present in each of the nodes of the network, can determine which virtual channels of the TDM cycles are allocated in write mode, i.e. are write-allocated channels.

At each TDM cycle, each node uses the virtual write channels that are allocated to it to write data samples to its transmission FIFOs (for example the FIFO 206 for the node WAS2). A node writes a "null" symbol if there should be no data samples to be written to a virtual write channels that is allocated to it, i.e. when the corresponding application FIFO (for example one of the FIFOs 205.1 to 205.6 for the WSC) is empty. The introduction of such "null" symbols thus makes the speech time duration of the nodes on the communications network 101 independent of the sampling frequency of the application (i.e. the quantity of data sent by an application).

Thus, in addition to the fact that the nodes concatenate a set of data of predetermined quantity (corresponding to the number of virtual channels allocated to them in write mode) during a predetermined number of TDM cycles (corresponding to the duration of a cycle of the mesh network 101), the speech time of each node on the mesh network 101, in burst mode, is mastered and deterministic.

During an integer number P ($P \geq 1$) of TDM cycles, each node concatenates the data collected from the TDM bus. The duration of P TDM cycles corresponds to the duration of a cycle of the mesh network 101. At the end of these P TDM cycles, each node makes a MAC data frame comprising the concatenated data. Then, within the following network cycle, each node has successively access to the mesh network to send its MAC frame.

Each node receives the MAC frames coming from the other nodes and stores the data received in one of the reception FIFOs. After a fixed duration, at least greater than the latency of the network (for example the duration of a network cycle), each node has received the set of MAC frames sent out on the network. Thus, each node awaits the start of the next network cycle. At this precise instant (the start of the next network cycle), each node starts extracting the data received in the virtual channels that are allocated to it in read mode.

Through the tables stored in the TDM map register TDM_MAP 415, each node knows the virtual channels that are allocated to it in read mode. At the occurrence of an event identifying the start of a virtual read channel, the node (to which the virtual channel is allocated) obtains the data samples from the appropriate reception FIFO in reception. When a "null" symbol is detected, the corresponding sample is not used and is erased; any other symbol is present at output of the node within a virtual channel allocated to present in the consumer application of the audio channel to which the symbol belongs.

Consequently, the data samples of the application are presented at output of each of the nodes (receiving these samples) in the same order in which they were presented at the input of the node (the transmitter of the samples) which had preliminarily received the application. Furthermore, when at least two destination nodes present the same part of the data content at their output, each of these nodes of the network presents the data samples of the application at the same predetermined and precise point in time because the data samples are presented in the same time slot (virtual channel) of the same TDM cycle on each of the destination nodes, the clocks of the destination nodes being synchronized in phase and in frequency. Thus, data samples broadcast on a network may be presented at output of a plurality of nodes of the network at the same predetermined and precise instant.

Figure 3:
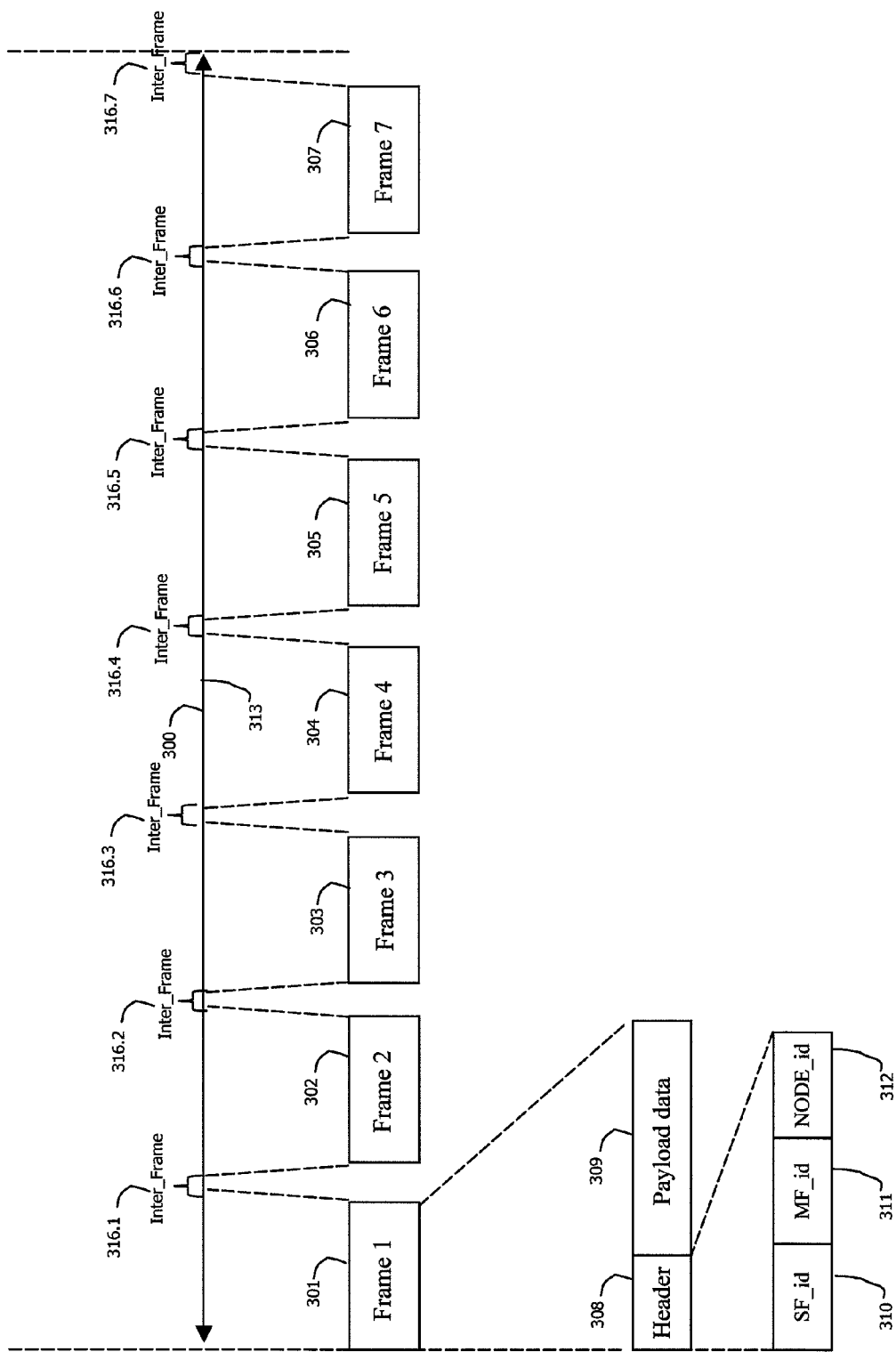
FIG. 3 is a drawing of a transmission cycle of the meshed wireless network of FIG. 1 according to the particular embodiment of the invention.

FIG. 3 presents a network cycle 313 of transmission in the wireless mesh network 101.

The super-frame 300 is part of a network cycle 313 of a fixed duration of, for example, 1 ms. In this duration, each node WSC or WAS of the network 101 sends its MAC frame during its speech time to the wireless mesh network 101 according to a predefined transmission sequence. Thus, the frame 1 is sent by the WSC node 110 and the second frame (frame 2) to seventh frame (frame 7) are sent respectively by the first to sixth WAS nodes. These first to seventh MAC nodes form the super-frame 300.

The first (frame 1) in the super-frame 300 corresponds to the sending of the MAC frame of the master node which is the WSC node 110. This frame is called the "head_frame". The nodes WAS1 to WAS6 are the slave nodes. The WSC node 110 is the node of the network that clocks the mesh network 101 and defines the cycles of the mesh network in generating the network cycle start signal 203.

Each MAC frame comprises a MAC header 308 and a payload data field 309. The MAC header 308 has three fields:
- the "SF_id" field 310 which identifies the super-frame 300
- the "MF_id" field 311 which identifies the MAC frame in the sequence of frames in the super-frame;
- the <<NODE_id>> field 312 which comprises an identifier of the node which sends the MAC frame.

Preferably, waiting times or gaps between the frames, referenced "inter_frames 316.1 to 316.7" are planned between the frames Frame 1 to Frame 7 in order absorb the jitter generated by the different nodes of the network and in order to enable switching between the transmission mode and the reception mode or enable the reorientation of the antennas.

Figure 4:
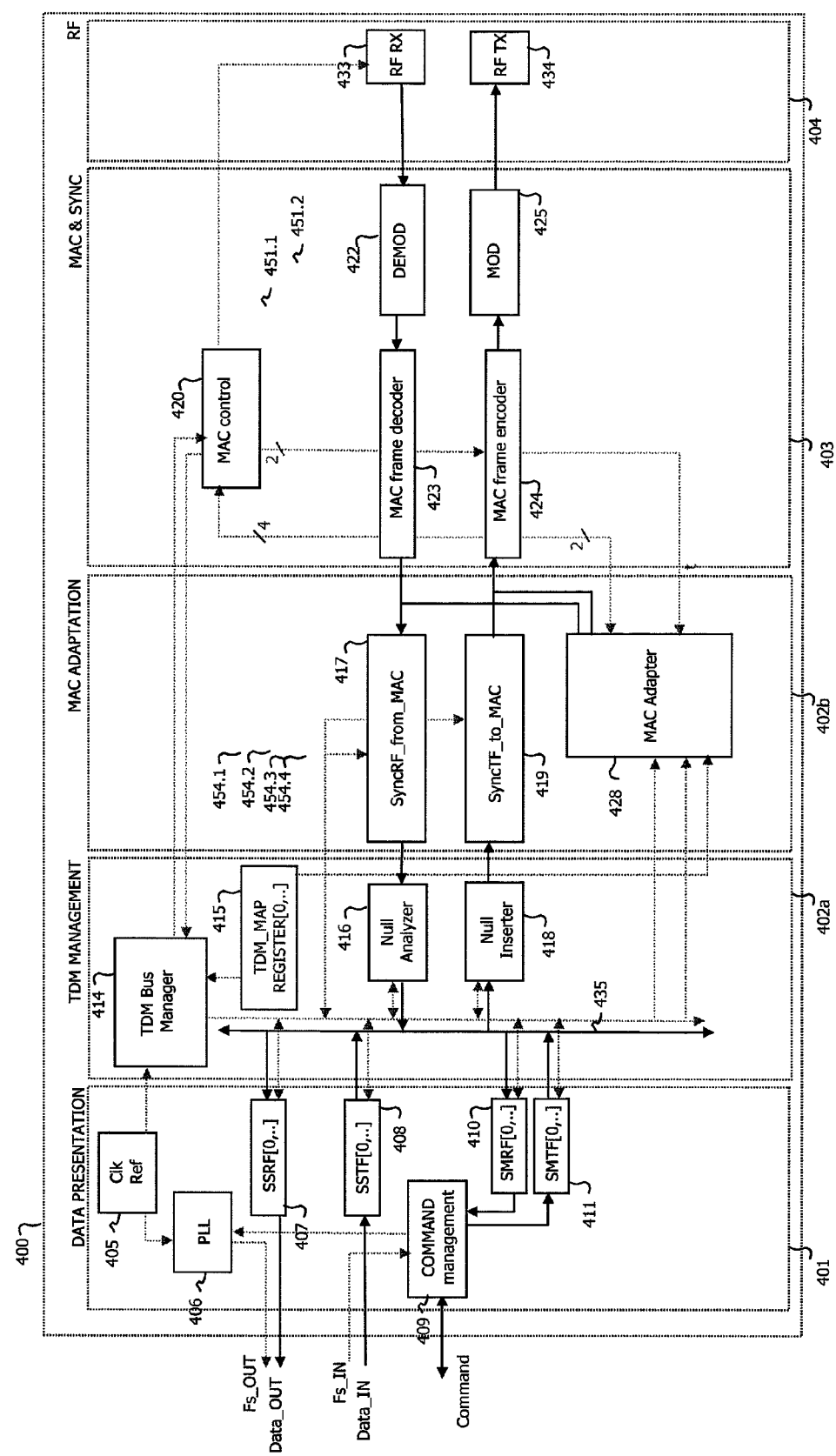
FIG. 4 is the drawing of a generic node of the meshed wireless network according to the particular embodiment of the invention.

FIG. 4 is the drawing of a generic node 400 of the wireless mesh network 101 according to the particular embodiment of the invention.

For example, each of the WSC nodes and WAS nodes of the wireless mesh network 101 is identical to the generic node 400.

The generic node 400 comprises the following five modules:
- a data presentation module 401 responsible for obtaining data from a data transmitting (or generating) module and providing or presenting data to a data receiving (or consuming) module;
- a TDM manager module 402a responsible for implementing a TDM type time-division multiplexing within the node of the mesh network 101 (this module 402a is used as a transportation layer by the data presentation module 401);
- a MAC adaptation module 402b enabling the implementation of the wireless mesh network 101 and carrying out the adaptation between the arrangement in the form of virtual channels of the TDM manager module 402a and the arrangement in the form of MAC frames of a MAC synchronization module 403 described here below;
- the MAC synchronization module 403 which implements the media access protocol. It is in charge of retransmission error correction and media access synchronization. In the case of a slave node, it gives the timing synchronization to the TDM manager module 402a. It also carries out the modulation and demodulation of data addressed to or coming from a radio module 404 described here below;
- the radio module 404 is the analog part of the access to the media. It is adapted to communication (transmission/reception) by means of millimeter waves.

The pieces of data coming from the transmit (or generator) application are stored in a set of synchronous stream transmit FIFOs (SSTF) 408 by transmitter (or generator) application at a frequency referenced Fs_IN.

The data addressed to the receiver application is stored in a set of SSRFs (Synchronous Stream Receive FIFOs) 407 by a TDM bus manager 414. These pieces of data are read by the receiver application at a frequency referenced Fs_OUT.

The application can send and receive control commands by means of a command manager interface 409 and a pair of FIFOs comprising a set of "Synchronous Message Receive FIFOs" (SMRF) 410 and a set of Synchronous Message Transmit FIFOs (SMTF). The generic node 400 comprises a reference clock 405 used by the TDM bus manager 414 to define the TDM cycles and the network cycles. This reference clock is also used by a phase-locked loop (PLL) 406 to generate the frequency Fs_OUT.

The configuration of the phase-locked loop (or PLL) 406 for the generation of the frequency Fs_OUT is achieved by the command management interface 409. At input of the generic node 400, the command management node 409 detects and transmits the value of the frequency Fs_IN through the synchronous message transmission FIFO 411. In a distant node (i.e. distant relative to the node 400), the command management interface of this distant node receives this value of the frequency Fs_IN through the synchronous message receive FIFO of this distant node. Thus the distant node can configure its phase-locked looped in order to deliver the same frequency value.

The TDM bus manager 414 controls a data bus 435 which connects the following FIFOs, the SSRF 407, the SSTF 408, the SMRF 410, the SMTF 411, a device 416 for the analysis of "null" values called a "null analyzer 416" and a device 418 for the insertion of "null" values called a "null inserter 418". The TDM bus manager 414 distributes the application data on the TDM virtual channels as defined by the already mentioned TDM map register TDM_MAP 415.

At each TDM cycle, the TDM bus manager 414 requests the null inserter device 418 to read the data of the transmitter application either from the SSTF FIFO 408 or from the SMTF FIFO 411 for all the virtual channels allocated in write mode. It can happen that there are no sufficient data in the SSTF and SMTF FIFOs to satisfy all the allocated virtual channels. In this case, the null inserter device 418 adds "null" symbols so as to fill the write-allocated virtual channels for which a quantity of data is missing.

Furthermore, at each TDM cycle, the manager of the TDM bus 414 requests the null analyzer device 416 to obtain TDM values from a SyncRF_from_MAC FIFO 417. These pieces of data are written either to the SS RF 407 or to the SMRF 410 using the TDM map register TDM_MAP 415. Certain virtual channels convey TDM data streams having "null" symbols. The null analyzer device 416 processes the "null" symbols in such a way that they cannot be interpreted by the TDM bus manager 414 as application data. Since the "null" symbols have been inserted by the null inserter device 418, they should not be communicated to the receiver (or consumer) application. The corresponding virtual channel allocated in read mode is then left empty. The "null" symbols are used to ensure that a same quantity of data is sent by the generic node 400 at each network cycle, i.e. the MAC frame which it generates has a fixed size from one network cycle to another, whatever the bit rate of the transmitter (or generator) application. Furthermore, the receiver (consumer) application retrieves the data at the frequency Fs_OUT which corresponds to the frequency Fs_IN used by the transmitter (or generator) application to clock the transmission (or generation) of the data as described here above. The "null" symbols are not transmitted to the receiver (or consumer) application so that it no longer receives data that the transmitter application had sent and thus prevents any time lag in the reception of data and prevent the overflow of the SSRF FIFO 407. The "null" symbols thus make it possible to ensure that a piece of data would be presented during the same virtual channel as the one that had been used on the source node, a certain number of TDM cycles earlier, to send out this same piece of data.

The MAC adapter 428 of the "MAC" adaptation module 402b obtains the data from the write-allocated virtual channels from the SyncTF_to_MAC MAC FIFO 419 at each TDM cycle. Then it arranges the TDM virtual channels in the chunks which form data blocks. The data conveyed in a MAC frame are grouped together as a function of the virtual channel with which they are associated. The MAC adapter 428 knows the allocation of the virtual channels used in write mode (as well as in read mode) by access to the TDM map register TDM_MAP 415 by means of the link 457. Once built, these chunks are transmitted to an encoding module 424 in the form of MAC frames during the reception of a signal referenced Tx_cycle_event 451 (indicating the start of the speech time of the generic node 400) delivered by a MAC controller 420. These chunks then constitute the payload data 309 of the MAC frame sent by the generic node 400.

In parallel, the encoding module 424 assigns predefined values to the fields SF_id 310, MF_id 311 and NODE_id 312 once the signal Tx_cycle_event 451 is active.

Then advantageously, a FEC (<<Forward Error Correction>>) type correction can be made on the MAC frame by the encoding module 424 before the MAC frame is transmitted to a MAC frame modulator 425.

Reciprocally, once a MAC frame is received by a MAC frame demodulator 422, it is transmitted to a MAC frame decoder 423 which can implement a FEC type correction.

If the header of the MAC frame is correct, a copy referenced frame_Rx_frame_id of the MF_id 311 field of the MAC header 308 is sent to the MAC controller 420 at the same time as a signal referenced frame_Rx_event is activated by means of a link 454. This information is then used to synchronize the access control.

In parallel, a copy referenced frame_Rx_event of the field SF_id 310 and a copy referenced frame_Rx_Node_id of the field NODE_id 312 of the MAC header 308 are sent through a link 453, to the MAC adapter 428 which reads the data blocks in the payload data field 309 de la MAC frame delivered by the MAC frame decoder 423 and stores them in a memory. The MAC adapter 428 receives data coming from the MAC frame decoder 423 in chunk form, i.e. the data conveyed in a MAC frame are grouped together according to the virtual channel with which they are associated. The MAC adapter 428 is then in charge of reordering the data so as to inject it into the SyncRF_from_MAC FIFO 417 in complying with the order in which they must be presented in the bus 435, TDM cycle after TDM cycle. The MAC adapter 428 knows the allocation of the virtual channels used in read mode (as well as in write mode) by access to the TDM map register TDM_MAP by means of the link 457.

The MAC controller 420 is responsible for implementing the MAC synchronization process both to determine the starts of speech time (the generation of the signal Tx_cycle_event 451) and to generate the signal representing the network cycle starts for the slave nodes (signal SF_slave_cycle_start 524). The signal Tx_cycle_event 451 indicating the instant from which the node can transmit or send on the network, following the instant at which the node preceding it in the transmission sequence has ceased to transmit, to which a waiting time interval (or gap) is added to enable the reorientation of the antennas and compensate for the jitter inherent in the wireless network 101.

It must be noted that, in the case of the master node, the generation of the signal representing the network cycle starts is the signal SF_master_cycle_start 520 and that it is generated by the TDM bus manager 414. The MAC controller 420 also checks the orientation of the antenna 112 in reception by means of a signal Antenna_Ctrl 455. It is considered to be the case here, in a particular mode of implementation of the mesh network 101, that the nodes orient their radio antennas in reception and use their antennas in omnidirectional mode in transmission, in order to make sure that all the nodes receive the information broadcast by the transmitter node while at the same time limiting the power needed for the transmission of the radio signal.

An RF (radio frequency) transmit module 434 performs the usual functions of a radio transmitter: conversion of the intermediate frequency at output of the modulator 425 into the frequency of the carrier used by the radio transmissions (conversion into high frequency), amplification, sending through an antenna etc.

An RF (radio frequency) receiver module 433 performs the usual functions of a radio receiver: reception via an antenna, filtering, detection of level, automatic gain control, conversion into low frequency, etc.

Figure 5:
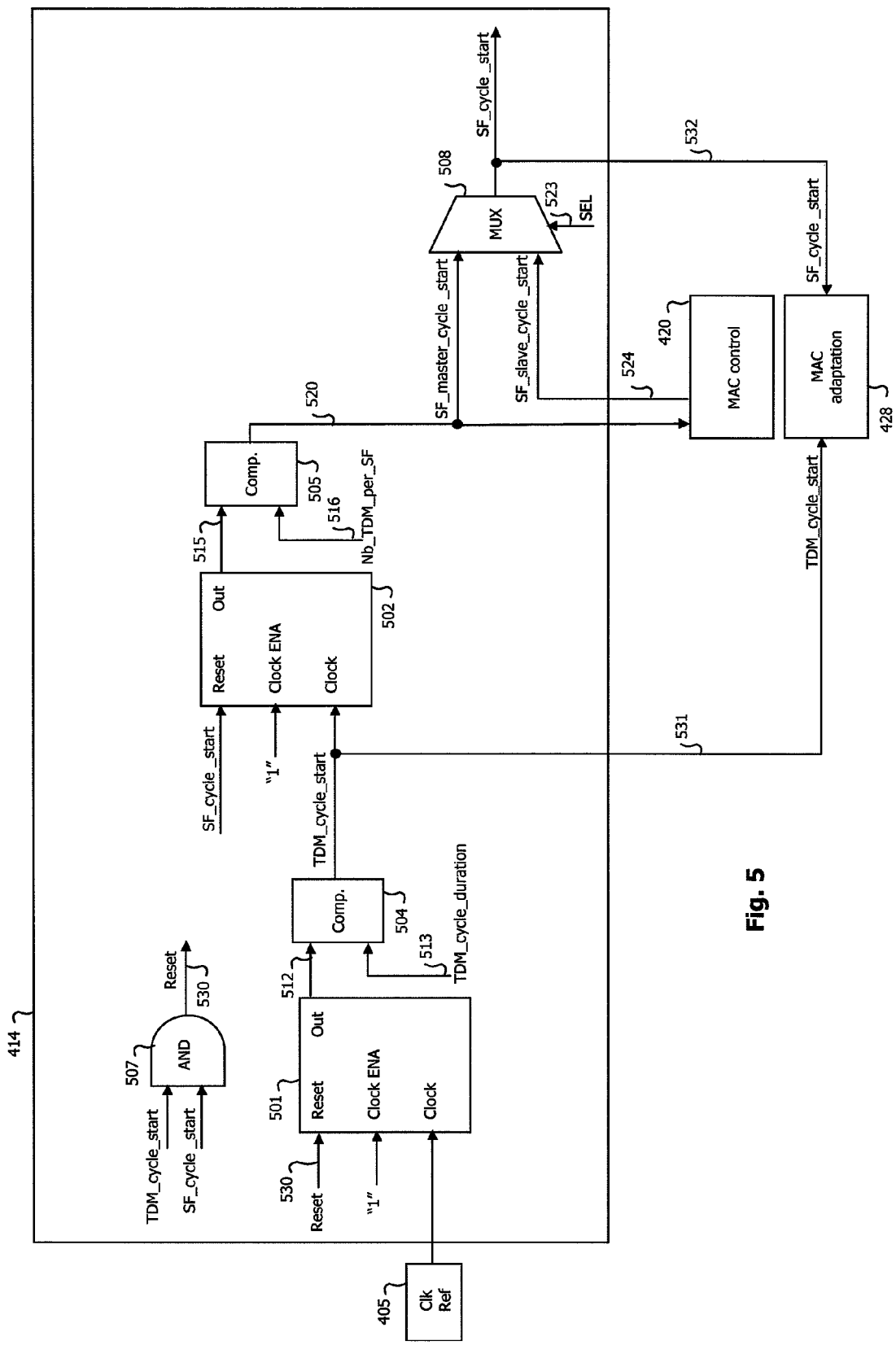
FIG. 5 illustrates the generation of TDM_cycle_start and SF_cycle_start signals (or events) by the TDM bus manager of the generic node according to the particular embodiment of the invention.

FIG. 5 illustrates the generation of TDM_cycle_start signals 531 and SF_cycle_start signals 532 (or events) by the TDM bus manager 414 of the generic node 400 in compliance with the particular embodiment of the invention.

A first counter 501 associated with a first comparator 504 generates a pulse at each TDM cycle.

The first counter 501 is clocked by the reference clock 405. The output of the first counter 501 is connected to the input 512 of the first comparator 504 so that it compares this output of the first counter 501 with the value of a signal TDM_cycle_duration 513 which indicates the duration of a TDM cycle. When the first counter 501 reaches the value of the signal TDM_cycle_duration 513, the output 531 of the first comparator 504 switches over to the value 1 and the first counter 501 is reset by a signal 530 described hereinafter.

Consequently, a pulse at the output 531 is generated at each TDM cycle, the pulse constituting a signal TDM_cycle_start 531, thus marking the start of each of each TDM cycle.

A second counter 502 counts the number of TDM cycles. Its output is connected to the input 515 of a second comparator 505 so that this comparator compares this output with the value of a signal Nb_TDM_per_SF 516 which indicates the number of TDM cycles per cycle of the mesh network 101. When the second counter 502 reaches the value of the signal Nb_TDM_per_LSF, the output 520 of the second comparator 505 switches to the value 1 and the first counter 501 and second counter 502 are reset. As a consequence, a pulse at the output 520 of the second comparator 505 is generated at each cycle of the mesh network 101, constituting an SF_master_cycle_start signal 520.

If the generic node 400 is a master node (WSC node 110), a signal SEL 523 is applied to the input of a multiplexer 508 in order to connect the output 532 of the multiplexer 508 to the SF_master_cycle_start signal 520.

If the generic node 400 is a slave node (nodes WAS1 to WAS6), a signal SEL 523 is applied at input of a multiplexer 508 in order to connect the output 532 of the multiplexer 508 to a signal SF_slave_cycle_start 524.

The output 531 of the first comparator 504, conveying the signal TDM_cycle_start, as well as the output of the multiplexer 508, conveying the signal SF_cycle_start, are connected to the inputs of an AND gate 507 and enable the generation of a signal 530 for resetting the first counter 501. This reset is performed in order to eliminate a time lag or delay existing between a slave node and a master node at the resetting of the nodes. This resetting enables the first signal SF_cycle_start to be synchronized with the start of a TDM cycle.

The signal TDM_cycle_start is used by the TDM bus manager 414 to activate read and write operations on the TDM virtual channels. The SF_master_cycle_start signal 520 is sent to the MAC controller 420.

The TDM_cycle_start message 531 and SF_cycle_start message 532 are sent to the MAC adapter 428, as described with reference to FIG. 4.

Figure 6:
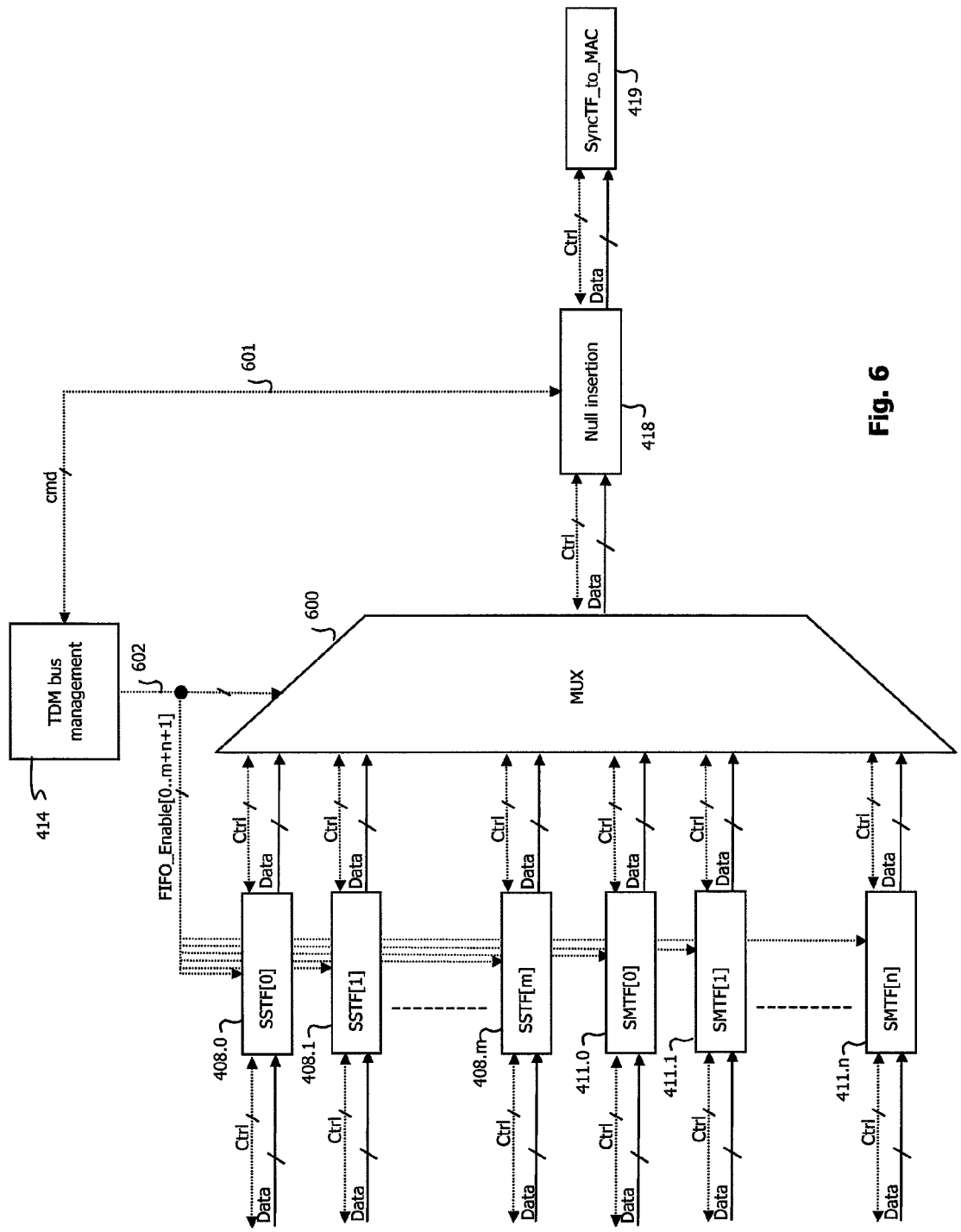
FIG. 6 illustrates the exchanges between the TDM bus manager, the device for the insertion of "null" values, the set of SSTF FIFOs, the set of SMTF FIFOs and the SyncTF_ to _MAC FIFO in the generic node according to the particular embodiment of the invention.

FIG. 6 illustrates the exchanges between the TDM bus manager 414, the null inserter device 418, the set of SSTF FIFOs 408 (sometimes simply called SSTF FIFOs for simplification), the set of SMTF FIFOs 411 (sometimes simply called SMTF FIFOs for simplification) and the SyncT- F_to_MAC FIFOs 419 in the generic node 400 according to the particular embodiment of the invention.

As explained here above with reference to FIG. 4, the application writes data samples in the SSTF FIFO 408 at the sampling frequency Fs_IN of the application and writes command samples in the SMTF FIFO 411.

The size of the samples may be 16 bits, 24 bits 48 bits, 64 bits or even any other size.

It is assumed that the set of SSTF FIFOs 408 comprises m+1 FIFOs referenced SSTF[0] to SSTF[m] and that the set of SMTF FIFOs 411 comprises n+1 FIFOs referenced SMTF [0] to SMTF[n]. In FIG. 6, only the FIFOs SSTF[0] 408.0, SSTF[1] 408.1, SSTF[m] 408.*m*, SMTF[0] 411.0, SMTF[1] 411.1 and SMTF[n] 411.*n* are represented with their respective control (Ctrl) and data (Data) signals. The sizes of the SSTF and SMTF FIFOs are chosen so that they can absorb the maximum quantity of application data that can be given by the transmitter (or generator) application during a TDM cycle. This maximum quantity can be computed by means of the frequency Fs_IN and the size of the application data samples.

The TDM bus manager 414 controls signals FIFO_Enable [0, m+n+1] 602 used to select the FIFO that must be read by the null inserter device 418. The signals FIFO_Enable[0, m+n+1] 602 are also used to configure a multiplexer 600 so that the null inserter device 418 is connected to the selected FIFO. The size of the data bus between the null inserter device 418 and the SSTF/SMTF FIFOs is 48 bits, which is the size of a virtual channel of the TDM bus.

The null inserter device 418 also writes data to the SyncTF_to_MAC FIFO 419. In this case, the data bus has a size of 49 bits owing to the fact that the null inserter device 418 adds a header bit which gives a piece of information on the validity of the virtual channel. This header bit is the most significant bit (MSB) of the data written to the SyncTF_to_MAC FIFO 419. The header bit takes the value 1 to indicate that the virtual channel is valid and it take the value 0 to indicate that the null inserter device 418 writes a null symbol to the SyncTF_to_MAC FIFO 419. For example, a "null" symbol is encoded with a value 0.

The size of the SyncTF_to_MAC FIFO 419 is chosen so that it can absorb the data of all the virtual channels during a TDM cycle. A command interface 601 is used by the TDM bus manager 414 to request the null inserter device 418 to process each write-allocated virtual channel as described hereinafter with reference to the algorithms of FIGS. 12 and 13A.

Figure 7:
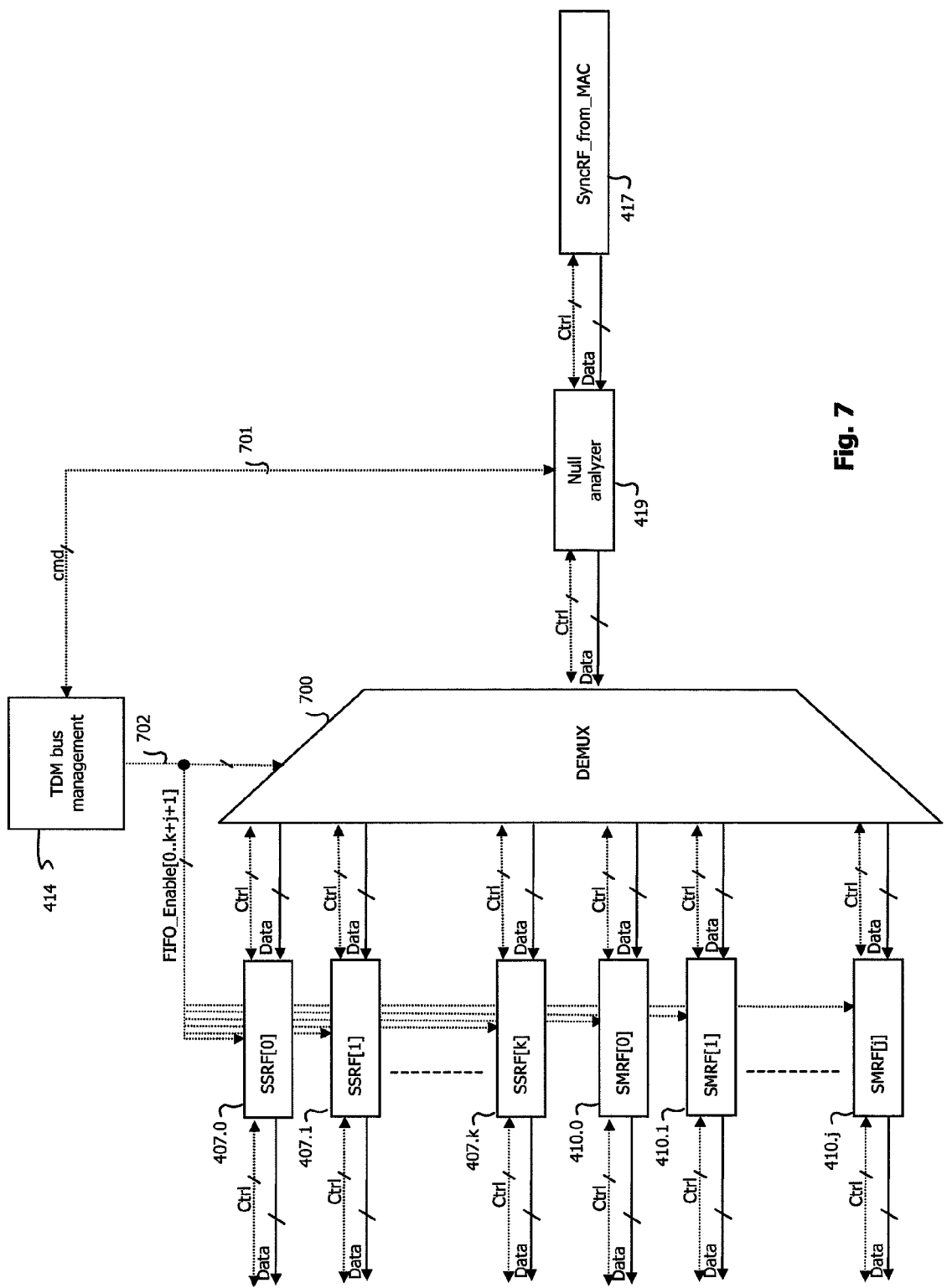
FIG. 7 illustrates the exchanges between the TDM bus manager, the device for the insertion of "null" values, the set of SSTF FIFOs, the set of SMTF FIFOs and the SyncTF_from_MAC FIFO in the generic node according to the particular embodiment of the invention.

FIG. 7 illustrates the exchanges between the TDM bus manager 414, the null analyzer device 416 the set of SSRF FIFOs 407 (sometimes simply called SSRF FIFOs for simplification), the set of SMRF FIFOs 410 (sometimes simply called SMRF FIFOs for simplification) and the SyncRF_from_MAC FIFO 417 in the generic node 400 according to the particular embodiment of the invention.

As explained here above with reference to FIG. 4, the application reads the data samples from the SSRF FIFOs 407 at the sampling frequency Fs_OUT of the application and reads the control samples from the SMRF FIFO 410.

The size of the samples may be 16 bits, 24 bits 48 bits, 64 bits or even any other size.

It is assumed that the set of SSRF FIFOs 407 comprises k+1 FIFOs referenced SSRF[0] to SSRF[k] and that the set of SMRF FIFOs 411 comprises j+1 registers referenced SMRF [0] to SMRF[j]. This FIG. 7 shows only the registers SSRF[0] 407.0, SSRF[1] 407.1, SSRF[m] 407.*m*, SMRF[0] 410.0, SMRF[1] 410.1 and SMRF[j] 410.*j* with their respective control (Ctrl) and data (Data) signals. The sizes of the SSRF and SMRF FIFOs are chosen so as to be able to absorb the maximum quantity of application data which may be presented to the receiver (or consumer) application during a TDM cycle. This maximum quantity can be computed by means of the frequency Fs_OUT and the size of the application data samples.

The TDM bus manager 414 controls signals FIFO_Enable [0, k+j+1] 702 used to select the FIFO that must be written to by the null analyzer device 416. The FIFO_Enable[0, k+j+1] signals 702 are also used to configure a multiplexer 700 so that the null analyzer device 416 is connected to the selected FIFO. The size of the data bus between the null analyzer device 416 and the SSRF/SMRF FIFOs is 48 bits, which is the size of a virtual channel of the TDM bus.

The null analyzer 416 also reads data in the SyncRF_from_MAC FIFO 417. In this case, the data bus has a size of 49 bits owing to the fact that a virtual channel is associated with a header bit which gives an indication on the validity of the channel.

The null analyzer device 416 extracts the header bit (which is the MSB or most significant bit) of the data read in the SyncRF_from_MAC FIFO 417. If the header bit has the value 1, then the data samples of the virtual channel are written to the selected FIFO (SSRF or SMRF FIFO). If the header bit has the value 0, which corresponds to a "null" symbol, the data of the virtual channel (i.e. the "null" symbol) are eliminated.

The size of the SyncRF_from_MAC FIFO 417 is chosen so that it can absorb the data of all the virtual channels during a TDM cycle. The command interface 701 is also used by the TDM bus manager 414 to request the null analyzer device 416 to process each read-allocated virtual channel as described hereinafter with reference to the algorithms of FIGS. 12 and 13B

FIG. 8 presents an example of a TDM map register TDM_MAP 415 according to the particular embodiment of the invention.

The TDM map register TDM_MAP 415 comprises a 32-bit memory zone for each virtual channel.

The pieces of data in the TDM map register TDM_MAP 415 are ordered according to the numbering of the virtual channels as given: at the first offset address aligned on 32 bits of the register, there is the memory zone corresponding to the virtual channel 0 and at the nth offset address aligned on 32 bits of the register, there is the memory zone corresponding to the virtual channel n.

The memory zone 800 of a given virtual channel comprises six fields:

- a <<function>> field 801 which comprises two bits and identifies the nature of the virtual channel, for example b00 means "virtual channel" in read mode, b01 means "virtual channel in write mode" and b1x means "unused virtual channel";
- an "SSRF" field 802 which comprises six bits and identifies the SSRF FIFO which is associated with the virtual channel, for example b000000 means that it is the FIFO SSRF[0], b000001 means that it is the FIFO SSRF[1], and b111111 means that no SSRF FIFO is associated with the virtual channel;
- an "SMRF>>" field 803 which comprises six bits and identifies the SMRF FIFO that is associated with the virtual channel, for example b000000 means that it is the FIFO SMRF[0], b000001 means that it is the FIFO SMRF[1], and b111111 means that no SMRF FIFO is associated with the virtual channel;
- an "SSTF" field 804 which comprises six bits and identifies the SSTF FIFO which is associated with the virtual channel, for example b000000 means that it is the FIFO SSTF[0], b000001 means that it is the FIFO SSTF[1], and b111111 means that no FIFO SSTF is associated with the virtual channel;

an "SMTF" field 805 which comprises six bits and identifies the SMTF which is associated with the virtual channel, for example, b000000 means that it is the FIFO SMTF[0], b000001 means that it is the FIFO SMTF[1], and b111111 means that no SMTF FIFO is associated with the virtual channel.

A "reserved" field 806 comprising six bits which are reserved for any forthcoming application.

FIG. 9 shows an example of architecture of the MAC adapter 428 according to the particular embodiment of the invention.

The MAC adapter 428 comprises a memory 900 (for example of the RAM or "Random Access Memory" type), Mux_demux registers 906 and the following four modules:

a transmission chunk manager module 901 responsible for the arrangement of the virtual channels of the TDM bus of the SyncTF_to_MAC FIFO 419 in the memory 900 so as to create chunks or containers; this transmission chunk manager 901 interfaces with the memory 900 by means of the register RefBaseAddrRegister 911 which gives basic addresses for the writing of data;

a module Tx_To_MAC 902 for transmission to the MAC layer which is responsible for the transfer of the chunks to be transmitted from the memory 900 to the encoding module 424 in the form of MAC frames. The Tx_To_MAC module 902 interfaces with the memory 900 by means of the register TxToMACBaseAddrRegister 912 which gives basic addresses for the reading of data;

a module Rx_From_MAC 903 for reception from the MAC layer which is responsible for the transfer of the chunks received from the MAC frame decoder 423 to the memory 900. The module Rx_From_MAC 903 interfaces with the memory 900 by means of the register RxFromMACBaseAddrRegister 913 which gives basic addresses for the writing of data;

a module Rx_To_TDM 904 for reception to the TDM bus which is responsible for the extraction of data from their chunks from the memory 900 and the writing of the extracted data to the SyncRF_From_MAC FIFO 417. The module Rx_To_TDM 904 interfaces with the memory 900 by means of the register RxToTDMBaseAddrRegister 914 which gives basic addresses for the reading of data.

At each start of a TDM cycle defined by the signal TDM_cycle_start coming from the TDM bus manager 414, the transmission chunk management module 901 reads the content of the SyncTF_to_MAC FIFO 419. This content comprises data from the virtual channels with header bits collected during the previous TDM cycles. Each piece of data is then written to the memory 900 at an address defined by means of the information contained in the registers of the TDM map register TDM_MAP 415 and obtained by means of the link 457.

At each start of a cycle of the mesh network 101 defined by an event SF_cycle_start coming from the TDM bus manager 414, the MAC adapter 428 has collected data on the virtual channels during the previous network cycle. In the memory 900, the data from the virtual channels are arranged in chunks as indicated here below with reference to FIG. 10. At reception of a signal Tx_cycle_event 451 coming from the MAC controller 420 and following the reception of a signal ReadyForTx 916 coming from the transmission chunk manager module 901, the module Tx_To_MAC 902 reads the data chunks to be transmitted from the memory 900 to the addresses defined by means of the information contained in the TDM map register TDM_MAP 415 and writes the data chunks to the encoding module 424 in the form of MAC frames. The module Tx_To_MAC 902 will concentrate on the reading of the chunks for which it has received a signal ReadyForTx 916 coming from the transmission chunk manager module 901.

Upon reception of an event frame_Rx_event on the link 454, the module Rx_From_MAC 903 reads the data chunks received from the decoder MAC frame decoder 423 and writes these data chunks to the memory 900 at the addresses defined by means of the information contained in the parameter frame_Rx_Node_id obtained by the link 454 and in the registers Mux_demux 906. Indeed, as described here below with reference to FIG. 11, the registers Mux_demux 906 enable the identification of those chunks, i.e. those virtual channels that are present in the frames generated by each of the nodes of the mesh network 101.

At each start of a network cycle defined by an event SF_cycle_start coming from the TDM bus manager 414, the module Rx_To_TDM 904 reads the data of the TDM virtual channels with their header bits of the chunks received and stored in the in the memory 900. The addresses for this read operation are defined by means of the information contained in the TDM map register TDM_MAP 415 and obtained by means of the link 457. Then the data of the TDM virtual channels with their header bits are written in the SyncRF_from_MAC FIFO 417. Those operation is then repeated at reception of each TDM_cycle_start, signal indicating the start of a new TDM cycle up to the end of the network cycle.

At each start of a network cycle defined by an SF_cycle_start coming from the TDM bus manager for 14, the register RefBaseAddrRegister 911 takes one of three possible base address values of the memory 900. As described here below with reference to FIG. 10, the memory 900 is divided into three compartments. Each of these compartments is used alternately to:

build the chunks to be sent to the MAC layer from the data coming from the TDM bus;

send the chunks to the MAC layer and receive the chunks from the MAC layer;

disassemble the chunks to send the data to the TDM bus.

At each change of a network cycle, the transmission chunk manager modules 901, Tx_To_MAC 902, Rx_From_MAC 903 and Rx_To_TDM 904 use a different memory zone and hence use different base addresses. The information contained in the register RefBaseAddrRegister 911 is transmitted to the modules Tx_To_MAC 902, Rx_From_MAC 903 and Rx_To_TDM 904 using a link 915 and the registers TxToMacBaseAddrRegister 912, RxFromMacBaseAddrRegister 913 and RxToTDMBaseAddrRegister 914 take a value of a base address of the memory 900 as a function of the information received by means of the link 915.

FIG. 10 shows an example of an architecture of the memory 900 according to the particular embodiment of the invention.

The memory 900 comprises a first compartment associated with the base address 0, a second compartment associated with a base address 1 and a third compartment associated with a base address 2.

Each compartment of the memory 900 may contain the same number M of chunks. A chunk comprises a chunk header and a number P of virtual channels. P is the number of TDM cycles per network cycle. For example, the chunk number k comprises the virtual channel number k of the first TDM cycle. The virtually channel number k of the second TDM cycle, . . . up to a virtual channel number k of the last TDM cycle of a same network cycle. The chunk header is example a concatenation of header bits added to each TDM cycle by the null inserter device 418 for the data of the virtual Channel associated with the chunk.

M is the number of virtual channels per TDM cycle. Each compartment of the memory 900 may contain all the virtual channels of the duration of a network cycle. The chunks are ordered as a function of their chunk number, from the smallest chunk number to the largest chunk number. The virtual channels are ordered as a function of their number, from the smallest to the largest virtual channel number.

The size of the chunk header is included in a "ChunkHeaderSize" field, the size of the chunk is included in a "ChunkSize" field, the size of a virtual channel is included in a "VcSize" field. In the case of a 48-bit virtual channel and 48-bit data bus for the memory 900, the field "VcSize" possesses the value 1, the field ChunkSize possesses the value P+ChunkHeaderSize and the field ChunkHeaderSize possesses the following value: Int(P/48)+1 where Int( ) is the "integer part" function.

At each network cycle, a specific task is assigned to each compartment of the memory 900. For example, if for a given network cycle:
- the first compartment is used for the arrangement of chunks coming from a TDM bus (data associated with the network cycle C for example);
- the second compartment is used for transmission to reception from the mesh network 101 (data associated with the network cycle C−1);
- the third compartment is used to carry out the disassembling of chunks and the extraction of virtual channels towards the TDM bus (data associated with the network cycle C−2), then, during the next network cycle:
- the first compartment is used for transmission to or reception from the mesh network;
- the second channel is used to carry out the extraction of a virtual channel towards a TDM bus;
- the third compartment is used for the arrangement of chunks coming from a TDM bus.

The register RefBaseAddrRegister 911 successively selects the three base addresses of the memory 900 in the following order: base address 2, base address 1 and base address 0. The change in the value of the base address is activated by the reception of the signal SF_cycle_start, as described here above.

FIG. 11 presents an example of an architecture of the registers mux_demux 906 according to the particular embodiment of the invention.

The registers mux_demux 906 give the list of chunks transmitted by each of the nodes. A register is associated with each node. The pieces of data are organized according to the numbering of the nodes of the network: at the first offset address, there is the memory zone corresponding to the chunks of the node 0 and, at the nth offset address, there is the memory zone corresponding to the chunks of the node n. For each register, the value of the bit in the position I indicates whether or not the chunk number I (i.e. the chunk associated with the virtual channel I) is transmitted by this node. The value 0b indicates that the chunk is not transmitted by the node, the value 1b indicates that the chunk is transmitted by the node.

FIG. 12 presents the main steps of a processing algorithm performed by the TDM bus manager 414 on the period of a network cycle according to the particular embodiment of the invention.

After a reset phase, the TDM bus manager 414 is in a waiting or idle state at the start of a network cycle in a step 1200. At the start of a network cycle, characterized by a signal SF_cycle_start, in a step 1201, the genetic node 400 can start read/write operations. Should the generic node 400 be a slave node, it means that the slave node has just got synchronized with the master node.

In a step 1202, a virtual channel counter TDM_VC is reset at 0. In a step 1203, the TDM bus manager 414 reads the registers of the TDM map register 415 at the offset address defined by the value of the counter TDM_VC. It thus obtains information on the function (reading or writing) of the current virtual channel and on the FIFO of the application to be selected (SSRF 407, SSTF 408, SMRF 410 or SMTF 411).

In a step 1204, a check is made to see whether the current virtual channel is a write-allocated virtual channel. If the current virtual channel is a write-allocated virtual channel, then in a step 1205, the TDM bus manager 414 selects the (application) transmission FIFO (SSTF 408 or SMTF 411) which must be read. In this step, the TDM bus manager 414 activates the signal FIFO_Enable[i], where i is the value extracted from the TDM map register 415, as described here above with reference to FIG. 6.

In a step 1206, a request comprising a command for performing a read operation on the selected FIFO is sent to the null inserter device 418. Then, in a step 1210, the value of TDM_VC is incremented by one unit.

If the current virtual channel is not a write virtual channel then, in a step 1207, the TDM bus manager 414 checks to see whether the current virtual channel is a read virtual channel (if not, it means that the virtual channel is not assigned to the transmission of data). If the current virtual channel is a read virtual channel then, in a step 1208, the TDM bus manager 414 selects the (application) reception FIFO (SSRF 407 or SMRF 410) which must be written to. In this step, the TDM bus manager 414 activates the signal FIFO_Enable[i], where i is the value extracted from the TDM map register 415, as described here above with reference to FIG. 7.

In a step 1209, a request comprising a command for carrying out a write operation in the selected FIFO is sent to the null analyzer device 416. Then, in a step 1210, the value of TDM_VC is incremented by one unit.

If the current virtual channel is not a read virtual channel and is not a write virtual channel, then the step 1210 is directly performed after the step 1207.

Then in a step 1211, the TDM bus manager 414 checks to see whether all the virtual channels of the TDM cycle have been processed. If not, the step 1203 is performed again. If the virtual channels have been processed then, in a step 1212, the TDM bus manager 414 waits for the arrival of a signal TDM_cycle_start which characterizes the start of a new TDM cycle. In a step 1213, at the arrival of a signal TDM_cycle_start, the TDM bus manager 414 again performs the step 1202 to process the new TDM cycle.

FIGS. 13A and 13B present the main steps of processing algorithms performed by the null inserter device 418 (FIG. 13A) and by the null analyzer device 416 (FIG. 13B) according to the particular embodiment of the invention.

With regard to FIG. 13A, after a reset phase, in a step 1300, the null value inserter device 418 is in an idle state of waiting for a request for reading an (application) transmit FIFO (SSTF 408 or SMTF 411) coming from the TDM bus manager 414. In a step 1301, the null value inserter device 418 receives a request of this kind identifying a selection of (application) transmit FIFOs (SSTF 408 or SMTF 411). Then, in a step 1302, the null inserter device 418 checks to see whether the selected FIFO is empty or not.

If the selected FIFO is declared to be empty because the FIFO has an available quantity of data lower than the capacity of a virtual channel (48 bits) then, the null inserter device 418 assigns the value 0 to the header bit of the data sample for the virtual channel in a step 1303. Then, in a step 1304, it writes the data sample to the FIFO SyncTF_to_MAC 419, with a header at 0 with which it concatenate a "null" symbol (which in the present case is equal to 48 bits at the value 0). Then the step 1300 is again performed.

If the selected FIFO is not declared to be empty then, in a step 1305, the null inserter device 418 reads the 48-bit data sample in the selected FIFO. Then it assigns the value 1 to the header bit of the data sample for the virtual channel in a step 1306. Then, in a step 1307, it writes the data sample to the SyncTF_to_MAC FIFO 419, with a header at 1 with which it concatenates the data of the selected FIFO. Then, the step 1200 is again performed.

With respect to the FIG. 13B, after a reset phase, in a step 1310, the null analyzer device 416 is in an idle state of waiting for a write request for writing to a (application) reception FIFO (SSRF 407 or SMRF 410) from the TDM bus manager 414. In a step 1311, the null analyzer device 416 receives a request of this kind identifying a selection of (application) reception FIFOs (SSRF 407 or SMRF 410). Then, in a step 1312, the null analyzer device 416 checks to see whether the SyncRF_from_MAC FIFO 417 is empty or not.

If the SyncRF_from_MAC FIFO 417 is declared to be empty because no sample is available in the FIFO, then the step 1310 is again performed.

If the SyncRF_from_MAC FIFO 417 is not declared to be empty then, in a step 1313, the null analyzer device 416 reads the 49 bit data sample in the SyncRF_from_MAC FIFO 417. Then it extracts therefrom the most significant bit corresponding to the validity bit of the virtual channel. In a step 1314, the null analyzer device 416 checks to see whether the value of the header bit is 0.

If the value of the header bit is 0, then the virtual channel comprises a null symbol which has been inserted by the null inserter device 418 of a distant node (source node) of the generic node 400. The piece of data is then eliminated and a step 1310 is performed again.

If the value of the header bit is 1, then the content of the virtual channel (48 bits) is written to the FIFO selected by the TDM bus manager 414 and then the step 1310 is again performed.

FIG. 14 presents the main steps of a processing algorithm performed by the transmission chunk manager module 901 of the MAC adapter 428 according to the particular embodiment of the invention.

After a reset phase, in a step 1400, the transmission chunk manager module 901 is in an idle state of waiting for the starting up of a network cycle (characterized by a signal SF_cycle_start). In a step 1401, a signal SF_cycle_start is received, indicating the start of a current network cycle.

Then, in a step 1402, a counter TDM_cycle is reset at 0 and the read/write operations of the virtual channels will then be performed by the transmission chunk manager module 901 starting with the first TDM cycle of the network cycle (TDM_cycle=0).

In a step 1403a, the transmission chunk manager module 901 resets a variable VCnum at the value −1. Then, in a step 1403b, the transmission chunk manager module 901 will then make a search, using the information contained in the TDM map register, to determine the following virtual channel allocated in write mode or write-allocated virtual channel. The search is made in the rising order of virtual channel numbers, starting from the value contained in the variable VCnum. The number identifying the write-allocated virtual channel found, is then stored in the variable VCnum.

In a step 1404, the transmission chunk manager module 901 checks to see whether a write-allocated channel has been found i.e. in verifying that the variable VCnum is equal to −1. If the variable VCnum is not equal to −1 then, in a step 1406a, the transmission chunk manager module 901 reads a quantity of data contained in the FIFO SyncTF_to_MAC 419, the quantity of data read being equal to the size of a virtual channel of the TDM bus. These pieces of data correspond to the pieces of data sent out on the TDM bus in the virtual channel found in the preceding step. In order to ensure the creation of a chunk associated with the vertical channel identified by VCnum, the transmission chunk manager module 901 then writes this data to the memory 900 of the offset address defined by the following sum:

$$(VCnum*ChunkSize)+ChunkHeaderSize+(TDM\_cycle*VcSize),$$

where ChunkSize is the size of a data chunk, ChunkHeaderSize is the size of a data chunk header and VcSize is the size of a virtual channel.

Then the transmission chunk manager module 901 writes or updates the header of the concerned chunk in the memory 900 at the address defined by the following multiplication: VCnum*ChunkSize. In a particular mode of implementation of the invention, the pieces of data stored in the payload data part of a chunk are the pieces of data (48 bits per TDM cycle) sent in the virtual channel associated with the chunk and the header of the chunk comprises, for each TDM cycle, the header added by the null inserter module 418 for this virtual channel.

Then, in a step 1406b, the transmission chunk manager module 901, using the information contained in the TDM map register 415, will seek to determine the next virtual channel allocated in write mode in the same way as is done in the step 1403b. The step 1404 is then implemented again.

If, in the step 1404, VCnum is equal to −1, then it means that all the write-allocated virtual channels of the TDM cycle have been processed and the virtual channel counter TDM_cycle is incremented by one unit in a step 1405. Then, in a step 1407, the transmission chunk manager module 901 checks to see whether the current TDM cycle is the last TDM cycle of the current network cycle.

If the current TDM cycle is not the last TDM cycle of the current network cycle then, in a step 1408, the transmission chunk manager module 901 waits for the start of the next TDM cycle (characterized by the arrival of the signal (or event) TDM_cycle_start). Then, in a step 1409, a TDM_cycle_start signal is received before the step 1403 is again performed for this next TDM cycle.

If the current TDM cycle is the last TDM cycle of the current network cycle then, in a step 1410, the transmission chunk management module 901 waits for the start of the next network cycle (characterized by the arrival of a signal SF_cycle_start). Then, in a step 1411, a signal SF_cycle_start is received. Then, the transmission chunk manager module 901 generates a message ReadyForTx 916 which it sends to the module Tx_To_MAC 902 in order to inform it of the availability of the chunks to be sent on the mesh network 101 before the step 1402 is again performed for this next network cycle.

FIG. 15 presents the main steps of a processing algorithm implemented by the module Tx_To_MAC 902 of transmission to the MAC layer of the MAC adapter 428 according to the particular embodiment of the invention.

After a reset phase, in a step 1500, the module Tx_To_MAC 902 for transmission to the MAC layer is in a idle state of waiting for a signal ReadyForTx 916 coming from the transmission chunk manager module 901 informing it that it has completed the creation of the chunks to be inserted in a frame to be sent. In a step 1501, the module Tx_To_MAC 902 receives a signal ReadyForTx 916.

Then, in a step 1502, the module Tx_To_MAC 902 waits for the start (characterized by the reception of a signal Tx_cycle_event 451) of the speech time granted to the generic mode 400 (to which it belongs) for the transmission on the network during the current network cycle.

At reception of a signal (or event) Tx_cycle_event (step 1503), the module Tx_To_MAC 902 can transmit data chunks to the encoding module 424 in the form of MAC frames. Then, in a step 1504, the module Tx_To_MAC 902 obtains the number of the next write virtual channel as described here above with reference to the step 1403b.

The result corresponds to the number of the next chunk to be transmitted (the first when the step 1504 is implemented for the first time in the network cycle). Furthermore, the register TxToMacBaseAddrRegister enabling the selection of the base address for access to the memory 900 is updated on the basis of information obtained by means of the link refBaseAddr 915.

In a step 1505, the module Tx_To_MAC 902 checks to see if another chunk has to be processed for this network cycle. If this is the case, then the step 1500 is again implemented. If this is not the case, then in a step 1506, the moduleTx_To_MAC 902 reads the chunk (header of the chunk and the virtual channels of the chunk) in the memory 900 starting at the memory address defined by the multiplication VCnum*ChunkSize, where ChunkSize is the size of a data chunk and VCnum is the number identifying the virtual channel concerned. Then, it writes the chunk to the encoding module 424 in the form of MAC frames.

Then, the module Tx_To_MAC 902 asks for the number of the next write-allocated virtual channel before again performing the step 1505.

FIG. 16 presents the main steps of a processing algorithm implemented by the module Rx_From_MAC 903 for reception from the MAC of the MAC adapter 428 according to the particular embodiment of the invention.

After a reset phase, in a step 1600, the module Rx_From_MAC 903 is in an idle state of waiting for the start of a super frame (characterized by a message SF_cycle_start). In a step 1601, a signal SF_cycle_start is received indicating the start of a network cycle.

Then, in a step 1602, the module Rx_From_MAC 903 waits for the start (characterized by the reception of a signal frame_Rx_event) indicating the reception of a MAC frame by the generator node 400 (to which it belongs) on the network.

At the (step 1603) of a signal frame_Rx_event coming from the MAC frame decoder 423, the module Rx_From_MAC 903 can obtain the received data chunks coming from the MAC frame decoder 423.

Then, in a step 1604, the module Rx_From_MAC 903 resets a variable ChunkNum at the value −1. The module Rx_From_MAC 903, using the information contained in the registers Mux_demux 906, will seek to determine the next chunk present in the received frame that has been sent out by the node identified by the information frame_Rx_Node_id obtained by the link 454. The search is made in the rising order of the chunks (or virtual channel numbers), starting from the value contained in the variable ChunkNum. The number identifying the chunk (i.e. corresponding to a virtual channel of the read-allocated TDM bus) found is then stored in the variable ChunkNum.

Furthermore, the register RxFromMacBaseAddrRegister enabling the selection of the basic address for access to the memory 900 is updated on the basis of information obtained by means of the link refBaseAddr 915.

In a step 1605, the module Rx_From_MAC 903 makes a check to see whether the new value of the parameter ChunkNum is −1. If this is the case, it means that the set of chunks transmitted by the node identified has been processed by the module Rx_From_MAC 903 and the step 1602 is again performed. If this is not the case, then in a step 1606, the module Rx_From_MAC 903 reads the chunk (header of the chunk and the virtual channels of the chunk) on the MAC frame decoder 423, then it writes to the memory 900 in starting at the offset memory address defined by the following multiplication: ChunkNum*ChunkSize, where ChunkSize is the size of a data chunk.

Then the module Rx_From_MAC 903 searches for the number of the next chunk to be obtained from the node having sent the received frame before again performing the step 1605.

FIG. 17 presents the main steps of a processing algorithm performed by the reception module Rx_To_TDM 904 for reception towards the TDM bus of the MAC adapter 428 according to the particular embodiment of the invention.

After a reset phase, in a step 1700, the module Rx_To_TDM 904 is in an idle state of waiting for the start of a network cycle (characterized by a message SF_cycle_start). In a step 1701, a signal SF_cycle_start is received, indicating the start of a network cycle.

Then, in a step 1702, the module Rx_To_TDM 904 resets the counter TDM_cycle at 0 and starts performing operations for reading and writing data associated with virtual channels. A first operation consists in updating the basic address for access to the memory 900 in the register RxtoTdmBaseAddrRegister on the basis of information obtained by means of the link refBaseAddr 915. Then, in a step 1703, a variable VCnum is reset at −1.

In a step 1704, the module Rx_To_TDM 904, using the information contained in the TDM map register TDM_MAP, will seek to determine the next read-allocated virtual channel. The search is made in the rising order of virtual channel numbers, starting from the value contained in the variable VCnum. The number identifying the read-allocated virtual channel found is then stored in the variable VCnum.

In a step 1705, the module Rx_To_TDM 904 makes a check to see whether a read-allocated channel has been formed i.e. in checking that the variable VCnum is equal to −1. If VCnum is equal to −1, then it means that all the virtual channels of the TDM cycle have been processed and the TDM cycle counter TDM_cycle is incremented by one unit in a step 1706. Then, in a step 1707, the module Rx_To_TDM 904 verifies that the current TDM cycle is the last TDM cycle of the current network cycle.

If the current TDM cycle is not the last TDM cycle of the current network cycle, then in a step 1708, the module Rx_To_TDM 904 waits for the start of the next TDM cycle (characterized by the arrival of a TDM_cycle_start signal). Then, in a step 1709, a signal TDM_cycle_start is received before the step 1703 is again performed for this next TDM cycle.

If the current TDM cycle is the last TDM cycle of the current network cycle, then the step 1700 is again performed.

If, in the step 1705, VCnum is not equal to −1 then, in a step 1713, the module Rx_To_TDM 904 reads the part of data of this virtual channel that is read-allocated in the memory 900 at the address defined by the following sum:

(VCnum*ChunkSize)+ChunkHeaderSize+
(TDM_cycle*VcSize)

where ChunkSize is the size of a data chunk, ChunkHeaderSize is the size of a data contain a header and VcSize is the size of a virtual channel.

Then, the module Rx_To_TDM 904 reads the header of the virtual channel in the memory 900 at the address defined by the following multiplication: VCnum*ChunkSize, then writes the concatenation of the header of the virtual channel and of the data of the virtual channel to the SyncRF_from_MAC FIFO 417. The step 1704 is then performed again to obtain the number of the next read-allocated virtual channel to be processed.

The invention claimed is:

1. A method of transmitting at least one data content sent by a source node associated with a generator application to one or more destination nodes, each of the one or more destination nodes being associated with a consumer application, in a communications network including the source node and the one or more destination nodes, the network performing a first clocking that defines a plurality of network cycles for data transmission on the network, wherein the source node performs a second clocking that defines a plurality of local cycles for data transmission among the source node and each of the one or more destination nodes and the consumer application associated with each of the one or more destination nodes, each of the plurality of network cycles being equal to an integer multiple P, P≧1, of each of the plurality of local cycles, a start of each of the plurality of network cycles coinciding with a start of one of the plurality of local cycles, each of the plurality of local cycles including a plurality of virtual channels corresponding to a plurality of time slots, a set of the plurality of virtual channels being assigned to transmit the at least one data content, and wherein the method is performed by the source node and comprises:

concatenating the at least one data content obtained from the generator application associated with the source node during a set of the plurality of time slots corresponding to the set of the plurality of virtual channels assigned to transmit the at least one data content during the integer multiple number P of consecutive local cycles of the plurality of local cycles, and forming at least one concatenated data block; and transmitting the at least one concatenated data block during a speech time assigned to the source node during a first predetermined subsequent network cycle of the plurality of network cycles, the at least one data content included in the at least one concatenated data block being associated with one of the plurality of virtual channels and being supplied during a second predetermined subsequent network cycle of the plurality of network cycles to the consumer application associated with at least one of the one or more destination nodes.

2. The method of transmitting according to claim 1, wherein the concatenating is performed during the integer multiple P number of consecutive local cycles coinciding with one of the plurality of network cycles.

3. The method of transmitting according to claim 1, wherein the concatenating includes inserting at least one piece of padding information, when the generator application associated with the source node does not send the at least one data content during at least one of the plurality of the time slots corresponding to at least one of the plurality of virtual channels, called at least one empty virtual channel, allocated to transmit the at least one data content.

4. The method of transmitting according to claim 3, wherein a part of the at least one piece of padding information is of a size equal to a quantity of the at least one data content that the source node may obtain during the at least one of the plurality of time slots corresponding to the at least one empty virtual channel, and wherein the at least one piece of the padding information is inserted into one of the at least one concatenated data block as if the at least one piece of padding information had been received from the generator application during the at least one empty virtual channel.

5. The method of transmitting according to claim 1, wherein the concatenating includes data interleaving, grouping, and forming of a chunk, by each of the plurality of virtual channels, of the at least one data content obtained from the generator application during the integer multiple P number of consecutive local cycles.

6. A method of receiving at least one data content by a destination node, associated with a consumer application, from one or more source nodes, each of the one or more source nodes being associated with a generator application, in a communications network including the destination node and the one or more source nodes, the network performing a first clocking that defines a plurality of network cycles for data transmission on the network, wherein the destination node performs a second clocking that defines a plurality of local cycles for data transmission among each of the one or more source nodes and the destination node and the consumer application associated with the destination node, each network cycle being equal to an integer multiple P, P≧1, of each of the plurality of local cycles, a start of each of the plurality of network cycles coinciding with a start of one of the plurality of local cycles, each of the plurality of local cycles including a plurality of virtual channels corresponding to a plurality of time slots, a set of the plurality of virtual channels being assigned to transmitting the at least one data content, and wherein the method is performed by the destination node and comprises:

receiving, from the communications network, at least one block of concatenated data during a speech time assigned to the at least one of the source nodes;

extracting, from the at least one block of concatenated data received, data associated with at least one of the plurality of virtual channels, called at least one virtual read channel, assigned to transmit the least one data content;

supplying, from a predetermined subsequent network cycle of the plurality of network cycles, the at least one block of concatenated data extracted to the consumer application associated with the destination node, during at least one time slot corresponding to the at least one virtual read channel, for a duration of the integer multiple P number of consecutive local cycles of the plurality of local cycles.

7. The method of receiving according to claim 6, wherein the destination node detects a presence, in the at least one block of concatenated data, of at least one piece of padding information, associated with the at least one virtual channel assigned to transmit the at least one data content, the at least one piece of padding information not being supplied to the consumer application during the supplying.

8. The method of receiving according to claim 7, wherein a part of the at least one piece of padding information is of a size equal to a quantity of the at least one data content that the destination node may provide during one or more of the plurality of time slots corresponding to the plurality of virtual channels with which the part of the at least one piece of padding information is associated.

9. The method of receiving according to claim 7, wherein the destination node erases the at least one piece of padding information during the one or more of the plurality of time slots corresponding to the plurality of virtual channels with which the at least one piece of padding information is associated.

10. The method of receiving according to claim 6, wherein the extracting includes de-interleaving of the at least one data content, and identifying groupings, called chunks, by each of the plurality of virtual channels, of the at least one data content obtained from the one or more generator applications respectively associated with the one or more source nodes and re-orders and supplies the at least one data content by the local cycle to the consumer application associated with the destination node.

11. A source node associated with a generator application, the source node being a machine that sends at least one data content to one or more destination nodes, each of the one or more destination nodes being associated with a consumer application, in a communications network including the source node and the one or more destination nodes, the network performing a first clocking that defines a plurality of network cycles for data transmission on the network, the source node comprising:
a reference clock that is used to perform a second clocking that defines a plurality of local cycles for data transmission among the source node and each of the one or more destination nodes and the consumer application associated with each of the one or more destination nodes, each of the plurality of network cycles being equal to an integer multiple P, $P \geq 1$, of each of the plurality of local cycles, a start of each of the plurality of network cycles coinciding with a start of one of the plurality of local cycles, each local cycle including a plurality of virtual channels corresponding to a plurality of time slots, a set of the plurality of virtual channels being assigned to the at least one data content; and
a processor cooperating with a memory,
wherein the processor and the memory cooperate to concatenate the one or more data content obtained from the generator application associated with the source node during the plurality of time slots corresponding to the plurality of virtual channels assigned to transmit the at least one data content during the integer multiple P number of consecutive local cycles of the plurality of local cycles defined by the second clocking performed by the reference clock, and form at least one concatenated data block, and
wherein the processor and the memory cooperate to send, on the communications network, the at least one concatenated data block during a speech time assigned to the source node during a first predetermined subsequent network cycle of the plurality of network cycles, the at least one data content included in the at least one concatenated data block being associated with one of the plurality of virtual channels and being supplied during a second predetermined subsequent network cycle of the plurality of network cycles to the consumer application associated with at least one of the one or more destination nodes.

12. The source node according to claim 11, wherein the processor and the memory cooperate to concatenate the one or more data content during the integer multiple P number of consecutive local cycles coinciding with one of the plurality of network cycles.

13. The source node according to claim 11, wherein the processor and the memory cooperate to insert at least one piece of padding information, when the generator application associated with the source node does not send the at least one data content during at least one of the plurality of time slots corresponding to at least one of the plurality of virtual channels, called at least one empty virtual channel, assigned to transmit the at least one data content.

14. The source node according to claim 13, wherein a part of the at least one piece of padding information is of a size equal to a quantity of the at least one data content that the source node may obtain during at least one of the plurality of time slots corresponding to the at least one empty virtual channel, and
wherein the processor and the memory cooperate to insert the at least one piece of padding information into one of the at least one concatenated data block as if the at least one piece of padding information had been received from the generator application during the at least one empty virtual channel.

15. The source node according to claim 11, wherein the processor and the memory cooperate to group and form a chunk, by each of the plurality of virtual channels, of the at least one data content obtained from the generator application during the integer multiple P number of consecutive local cycles.

16. A destination node associated with a consumer application, the destination node being a machine that receives at least one data content from one or more source nodes, each of the one or more source nodes being associated with a generator application, in a communications network including the destination node and the one or more source nodes, the network performing a first clocking that defines a plurality of network cycles for data transmission on the network, the destination node comprising:
a reference clock that is used to perform a second clocking that defines a plurality of local cycles for data transmission among each of the one more source nodes and the destination node and the consumer application associated with the destination node, each of the plurality of network cycles being equal to an integer multiple P, $P \geq 1$, of each of the plurality of local cycles, a start of each network cycle coinciding with a start of one of the plurality of local cycles, each of the plurality of local cycles including a plurality of virtual channels corresponding to a plurality of time slots, a set of the plurality of virtual channels being assigned to transmit the at least one data content; and
a processor cooperating with a memory,
wherein the processor and the memory cooperate to receive, from the communications network, at least one block of concatenated data during a speech time assigned to at least one of the one or more source nodes,
wherein the processor and the memory cooperate to extract, from the at least one block of concatenated data, data associated with one of the plurality of virtual channels assigned to transmit the at least one data content, called a virtual read channel, and
wherein the processor and the memory cooperate to supply, from a predetermined subsequent network cycle of the plurality of network cycles, the data extracted from the at least one block of concatenated data to the consumer application associated with the destination node, during one of the plurality of time slots corresponding to the virtual read channel, for a duration of the integer multiple P number of consecutive local cycles of the plurality of local cycles defined by the second clocking performed by the reference clock.

17. The destination node according to claim 16, wherein the processor and the memory cooperate to detect a presence, in the at least one block of concatenated data, of at least one piece of padding information, associated with at least one of the plurality of virtual channels assigned to transmit the at least one data content, the destination node not supplying the at least one piece of padding information to the consumer application.

18. The destination node according to claim 17, wherein a part of the at least one piece of padding information is of a size equal to a quantity of the at least one data content that the destination node may provide during a set of the plurality of time slots corresponding to the set of the plurality of virtual channels with which the at least one piece of padding information is associated.

19. The destination node according to claim 17, wherein the processor and the memory cooperate to erase the at least one piece of padding information during the set of the plurality of time slots corresponding to the set of the plurality of virtual channels with which the at least one piece of padding information is associated.

20. The destination node according to claim 18, wherein the processor and the memory cooperate to identify groupings, called chunks, by each of the plurality of virtual channels, of the at least one data content obtained from the generator application associated with one of the one or more source nodes, and reorder and supply the at least one data content by the local cycle to the consumer application of the destination node.

21. A non-transitory computer-readable storage medium storing computer-executable instructions that, when executed by a computer, cause the computer to perform a method of transmitting at least one data content sent by a source node associated with a generator application to one or more destination nodes, each of the one or more destination nodes being associated with a consumer application, in a communications network including the source node and the one or more destination nodes, the network performing a first clocking that defines a plurality of network cycles for data transmission on the network, the source node performing a second clocking that defines a plurality of local cycles for data transmission among the source node and the one or more destination nodes and the consumer application associated with each of the one or more destination nodes, each of the plurality of network cycles being equal to an integer multiple P, $P \geq 1$, of each of the plurality of local cycles, a start of each network cycle coinciding with a start of one of the plurality of local cycles, each of the plurality of local cycles including a plurality of virtual channels corresponding to a plurality of time slots, a set of the plurality of virtual channels being assigned to transmit the at least one data content, wherein the method is performed by the source node and comprises:

concatenating the at least one data content obtained from the generator application associated with the source node during a set of the plurality of time slots corresponding to the set of the plurality of virtual channels assigned to transmit the at least one data content during the integer multiple P number of consecutive local cycles of the plurality of local cycles, and forming at least one concatenated data block; and transmitting, on the communications network, the at least one concatenated data block during a speech time assigned to the source node during a first predetermined subsequent network cycle of the plurality of network cycles, the at least one data content included in the at least one concatenated data block being associated with one of the plurality of virtual channels and being supplied during a second predetermined subsequent network cycle of the plurality of network cycles to the consumer application associated with at least one of the one or more destination nodes.

22. A non-transitory computer-readable storage medium storing computer-executable instructions that, when executed by a computer, cause the computer to perform a method of receiving at least one data content by a destination node associated with a consumer application, from one or more source nodes, each of the one or more source nodes being associated with a generator application, in a communications network including the destination node and the one or more source nodes, the network performing a first clocking that defines a plurality of network cycles for data transmission on the network, the destination node performing a second clocking that defines a plurality of local cycles for data transmission among each of the one or more source nodes and the destination node and the consumer application associated with the one or more source nodes, each of the plurality of network cycles being equal to an integer multiple P, $P \geq 1$, of one of the plurality of local cycles, a start of each of the plurality of network cycles coinciding with a start of one of the plurality of local cycles, each of the plurality of local cycles including a plurality of virtual channels corresponding to a plurality of time slots, a set of the plurality of virtual channels being assigned to transmit the at least one data content, wherein the method is performed by the destination node and comprises:

receiving, from the communications network, at least one block of concatenated data during a speech time assigned to at least one of the one or more source nodes;

extracting, from the at least one block of concatenated data received, data associated with one of the set of the plurality of virtual channels assigned to transmit the at least one data content, called a virtual read channel;

supplying, from a predetermined subsequent network cycle of the plurality of network cycles, the data extracted from the at least one block of concatenated data to the consumer application associated with the destination node, during one of the plurality of time slots corresponding to the virtual read channel, for a duration of the integer multiple P number of consecutive local cycles of the plurality of local cycles.

* * * * *